US012573288B2

(12) United States Patent
Bosua et al.

(10) Patent No.: US 12,573,288 B2
(45) Date of Patent: Mar. 10, 2026

(54) LIGHTING SYSTEM

(71) Applicant: Feit Electric Company, Inc., Pico Rivera, CA (US)

(72) Inventors: Phillip Bosua, San Francisco, CA (US); Marc Alexander, San Francisco, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

(21) Appl. No.: 18/784,832

(22) Filed: Jul. 25, 2024

(65) Prior Publication Data

US 2024/0378991 A1 Nov. 14, 2024

Related U.S. Application Data

(63) Continuation of application No. 17/191,539, filed on Mar. 3, 2021, now Pat. No. 12,080,158, which is a (Continued)

(51) Int. Cl.

*G08C 23/04* (2006.01)

*F21K 9/232* (2016.01)

(Continued)

(52) U.S. Cl.

CPC .............. *G08C 23/04* (2013.01); *F21K 9/232* (2016.08); *F21K 9/238* (2016.08);

(Continued)

(58) Field of Classification Search

CPC . F21Y 2113/13; F24F 8/20; F24F 8/22; F23F 8/20; F23F 8/22

See application file for complete search history.

(56) References Cited

U.S. PATENT DOCUMENTS

| | | | |
|---|---|---|---|
| 433,167 | A | 7/1890 | Glover |
| 463,584 | A | 11/1891 | Scholfield |

(Continued)

FOREIGN PATENT DOCUMENTS

| | | | |
|---|---|---|---|
| CN | 2558026 | Y | 6/2003 |
| CN | 101309237 | A | 11/2008 |

(Continued)

OTHER PUBLICATIONS

A New Kind of Clean, Vyv Antimicrobial Light works around the clock to create cleaner environments in the places we live, work, and play, viv, https://vyv.tech, downloaded Sep. 24, 2020.

(Continued)

*Primary Examiner* — Eric T Eide

(74) *Attorney, Agent, or Firm* — Alston & Bird LLP

(57) ABSTRACT

A connected lighting system that includes a substrate defining a broad face, a first set of light emitting elements, and a second set of light emitting elements. Each light emitting element of the second set of light elements may be configured to emit light having a fixed color parameter different from a first color parameter of the first set of lighting elements. The first and second sets of light emitting elements may be arranged at at least two different contiguous portions of the broad face of the substrate. A processor may be configured to control the first set of light emitting elements with a predetermined intensity and control relative intensities of one or more of the second set of light emitting elements to cooperatively emit light having a first color parameter value.

18 Claims, 13 Drawing Sheets

Related U.S. Application Data continuation of application No. 14/843,828, filed on Sep. 2, 2015, now Pat. No. 11,455,884.

(60) Provisional application No. 62/044,789, filed on Sep. 2, 2014.

(51) Int. Cl.

| | |
|---|---|
| ***F21K 9/238*** | (2016.01) |
| ***F21V 23/04*** | (2006.01) |
| ***H05B 45/00*** | (2022.01) |
| ***H05B 45/20*** | (2020.01) |
| ***H05B 47/105*** | (2020.01) |
| ***H05B 47/19*** | (2020.01) |
| *F21S 8/04* | (2006.01) |
| *F21Y 113/00* | (2016.01) |
| *F21Y 113/13* | (2016.01) |
| *F21Y 115/10* | (2016.01) |
| *H05B 47/115* | (2020.01) |
| *H05B 47/175* | (2020.01) |

(52) U.S. Cl.

CPC ......... *F21V 23/0435* (2013.01); *H05B 45/00* (2020.01); *H05B 45/20* (2020.01); *H05B 47/105* (2020.01); *H05B 47/19* (2020.01); *F21S 8/04* (2013.01); *F21Y 2113/13* (2016.08); *F21Y 2113/30* (2023.05); *F21Y 2115/10* (2016.08); *H05B 47/115* (2020.01); *H05B 47/196* (2024.01); *H05B 47/1985* (2024.01)

(56) References Cited

U.S. PATENT DOCUMENTS

| | | | |
|---|---|---|---|
| 590,523 | A | 9/1897 | Heath |
| 600,368 | A | 3/1898 | Jones et al. |
| 601,278 | A | 3/1898 | Pusey |
| 605,786 | A | 6/1898 | Herreshoff |
| 616,120 | A | 12/1898 | Leaycraft |
| 623,774 | A | 4/1899 | Fenton |
| 646,809 | A | 4/1900 | Dickman |
| 688,395 | A | 12/1901 | Davis et al. |
| 4,942,386 | A | 7/1990 | Willis |
| 5,420,607 | A | 5/1995 | Miller et al. |
| 5,506,946 | A | 4/1996 | Bar et al. |
| 5,710,545 | A | 1/1998 | Dunn |
| 5,769,527 | A | 6/1998 | Taylor et al. |
| 5,790,114 | A | 8/1998 | Geaghan et al. |
| 5,841,428 | A | 11/1998 | Jaeger et al. |
| 5,914,669 | A | 6/1999 | Wicks et al. |
| 6,003,206 | A | 12/1999 | Hall et al. |
| 6,121,976 | A | 9/2000 | Lu |
| 6,329,990 | B1 | 12/2001 | Silverbrook et al. |
| 6,337,629 | B1 | 1/2002 | Bader |
| 6,624,368 | B2 | 9/2003 | Sato et al. |
| 6,694,125 | B2 | 2/2004 | White et al. |
| 6,726,112 | B1 | 4/2004 | Ho |
| 6,737,801 | B2 | 5/2004 | Ragle |
| 6,759,966 | B1 | 7/2004 | Weng |
| 6,949,885 | B2 | 9/2005 | Hamamoto et al. |
| 7,103,460 | B1 | 9/2006 | Breed |
| 7,205,495 | B2 | 4/2007 | Mazur |
| 7,221,271 | B2 | 5/2007 | Reime |
| 7,339,128 | B2 | 3/2008 | Yen |
| 7,418,392 | B1 | 8/2008 | Mozer et al. |
| 7,446,671 | B2 | 11/2008 | Giannopoulos et al. |
| 7,474,632 | B2 | 1/2009 | Ban |
| 7,502,033 | B1 | 3/2009 | Axelrod |
| 7,573,208 | B2 | 8/2009 | Newman, Jr. |
| 7,597,455 | B2 | 10/2009 | Smith et al. |
| 7,598,885 | B2 | 10/2009 | Kwon et al. |
| 7,667,163 | B2 | 2/2010 | Ashworth et al. |
| 7,852,322 | B2 | 12/2010 | Park |
| 7,859,398 | B2 | 12/2010 | Davidson et al. |
| 7,884,556 | B2 | 2/2011 | Gandhi |
| 7,952,322 | B2 | 5/2011 | Partovi et al. |
| 7,980,726 | B2 | 7/2011 | Joosen et al. |
| 8,013,545 | B2 | 9/2011 | Jonsson |
| 8,024,517 | B2 | 9/2011 | Lafrese et al. |
| 8,033,686 | B2 | 10/2011 | Recker et al. |
| 8,035,320 | B2 | 10/2011 | Sibert |
| 8,100,552 | B2 | 1/2012 | Spero |
| 8,115,369 | B2 | 2/2012 | Kang et al. |
| 8,160,514 | B2 | 4/2012 | Aparin et al. |
| 8,195,313 | B1 | 6/2012 | Fadell et al. |
| 8,207,821 | B2 | 6/2012 | Roberge et al. |
| 8,253,344 | B2 | 8/2012 | Guest et al. |
| 8,282,250 | B1 | 10/2012 | Dassanayake et al. |
| 8,294,379 | B2 | 10/2012 | Liu et al. |
| 8,299,719 | B1 | 10/2012 | Moshirnoroozi |
| 8,314,566 | B2 | 11/2012 | Steele et al. |
| 8,334,777 | B2 | 12/2012 | Wilson et al. |
| 8,373,360 | B2 | 2/2013 | Leung et al. |
| 8,390,201 | B2 | 3/2013 | Yasuda et al. |
| 8,390,207 | B2 | 3/2013 | Dowling et al. |
| 8,398,264 | B2 | 3/2013 | Anderson et al. |
| 8,433,530 | B2 | 4/2013 | Shimada et al. |
| 8,446,288 | B2 | 5/2013 | Mizushima et al. |
| 8,491,159 | B2 | 7/2013 | Recker et al. |
| 8,523,410 | B2 | 9/2013 | Hashimoto et al. |
| 8,562,158 | B2 | 10/2013 | Chien |
| 8,569,968 | B2 | 10/2013 | Hsiao et al. |
| 8,581,512 | B2 | 11/2013 | Hamamoto et al. |
| 8,593,073 | B2 | 11/2013 | Aldrich et al. |
| 8,641,241 | B2 | 2/2014 | Farmer |
| 8,669,716 | B2 | 3/2014 | Recker et al. |
| 8,723,434 | B2 | 5/2014 | Watson et al. |
| 8,723,794 | B2 | 5/2014 | Corson et al. |
| 8,742,594 | B2 | 6/2014 | Daubenspeck et al. |
| 8,742,694 | B2 | 6/2014 | Bora et al. |
| 8,743,023 | B2 | 6/2014 | Maxik et al. |
| 8,743,923 | B2 | 6/2014 | Geske et al. |
| 8,755,561 | B2 | 6/2014 | Vlutters et al. |
| 8,760,370 | B2 | 6/2014 | Maxik et al. |
| 8,760,514 | B2 | 6/2014 | Chien |
| 8,764,251 | B2 | 7/2014 | Lien |
| 8,770,771 | B2 | 7/2014 | Preta et al. |
| 8,788,966 | B2 | 7/2014 | Josephson et al. |
| 8,812,827 | B2 | 8/2014 | Malasani |
| 8,820,984 | B2 | 9/2014 | Gillio |
| 8,829,799 | B2 | 9/2014 | Recker et al. |
| 8,834,009 | B2 | 9/2014 | Chien |
| 8,854,443 | B2 | 10/2014 | Kryger et al. |
| 8,858,029 | B2 | 10/2014 | Brandes et al. |
| 8,888,306 | B2 | 11/2014 | Thomas et al. |
| 8,890,435 | B2 | 11/2014 | Bora et al. |
| 8,902,049 | B2 | 12/2014 | Fushimi et al. |
| 8,928,232 | B2 | 1/2015 | Aggarwal et al. |
| 8,941,013 | B2 | 1/2015 | Arnold |
| 8,947,013 | B2 | 2/2015 | Sutardja et al. |
| 8,960,940 | B2 | 2/2015 | Hellkamp |
| 8,981,913 | B2 | 3/2015 | Henig et al. |
| 8,994,276 | B2 | 3/2015 | Recker et al. |
| 9,024,517 | B2 | 5/2015 | Yuan et al. |
| 9,030,120 | B2 | 5/2015 | Pickard et al. |
| 9,039,233 | B2 | 5/2015 | Fournier et al. |
| 9,049,756 | B2 | 6/2015 | Klusmann et al. |
| 9,055,055 | B1 | 6/2015 | Strand et al. |
| 9,074,736 | B2 | 7/2015 | Recker et al. |
| 9,080,758 | B2 | 7/2015 | Igaki et al. |
| 9,113,528 | B2 | 8/2015 | Bora et al. |
| 9,172,917 | B1 | 10/2015 | Fu et al. |
| 9,192,032 | B2 | 11/2015 | Kwag et al. |
| 9,198,262 | B1 | 11/2015 | Bosua et al. |
| 9,210,779 | B2 | 12/2015 | Bosua et al. |
| 9,247,625 | B2 | 1/2016 | Recker et al. |
| 9,253,859 | B2 | 2/2016 | Chung |
| 9,326,359 | B2 | 4/2016 | Bosua |
| 9,338,864 | B2 | 5/2016 | Bosua et al. |
| 9,345,098 | B2 | 5/2016 | Joseph et al. |
| 9,351,378 | B2 | 5/2016 | Aggarwal et al. |
| 9,368,695 | B2 | 6/2016 | David et al. |
| 9,404,624 | B2 | 8/2016 | Chung |

(56) References Cited

U.S. PATENT DOCUMENTS

| | | | |
|---|---|---|---|
| 9,408,282 | B1 | 8/2016 | Springer |
| 9,410,664 | B2 | 8/2016 | Krames et al. |
| 9,497,819 | B2 | 11/2016 | Van et al. |
| 9,510,426 | B2 | 11/2016 | Chemel et al. |
| 9,526,151 | B2 | 12/2016 | Kreiner et al. |
| 9,534,773 | B1 | 1/2017 | Turudic |
| 9,538,619 | B2 | 1/2017 | Swatsky et al. |
| 9,578,722 | B2 | 2/2017 | Feng et al. |
| 9,635,737 | B2 | 4/2017 | Bosua et al. |
| 9,644,799 | B2 | 5/2017 | Crayford et al. |
| 9,651,243 | B1 | 5/2017 | Springer |
| 9,677,755 | B1 | 6/2017 | Linnell et al. |
| 9,696,200 | B2 | 7/2017 | Ramer et al. |
| 9,699,871 | B2 | 7/2017 | Karc et al. |
| 9,801,260 | B2 | 10/2017 | Anthony et al. |
| 9,883,563 | B2 | 1/2018 | Bosua et al. |
| 9,936,566 | B2 | 4/2018 | Alexander et al. |
| 10,047,912 | B2 | 8/2018 | Bosua et al. |
| 10,085,331 | B2 | 9/2018 | Alexander et al. |
| 10,129,937 | B1 | 11/2018 | Lin et al. |
| 10,129,955 | B2 | 11/2018 | Rogers et al. |
| 10,129,965 | B2 | 11/2018 | Bosua et al. |
| 10,136,292 | B2 | 11/2018 | Bosua et al. |
| 10,274,160 | B2 | 4/2019 | Parker et al. |
| 10,304,901 | B1 | 5/2019 | Xu et al. |
| 10,375,789 | B2 | 8/2019 | Bosua et al. |
| 10,440,794 | B2 | 10/2019 | Alexander et al. |
| 10,588,206 | B2 | 3/2020 | Alexander et al. |
| 10,772,171 | B2 | 9/2020 | Bosua et al. |
| 10,779,385 | B2 | 9/2020 | Alexander et al. |
| 11,455,884 | B2 | 9/2022 | Bosua et al. |
| 11,632,846 | B2 | 4/2023 | Alexander et al. |
| 2002/0047628 | A1 | 4/2002 | Morgan et al. |
| 2002/0111135 | A1 | 8/2002 | White et al. |
| 2002/0145394 | A1 | 10/2002 | Morgan et al. |
| 2003/0019734 | A1 | 1/2003 | Sato et al. |
| 2003/0117408 | A1 | 6/2003 | Forsline et al. |
| 2004/0105264 | A1 | 6/2004 | Spero |
| 2004/0129946 | A1 | 7/2004 | Nagai et al. |
| 2004/0160198 | A1 | 8/2004 | Hewlett et al. |
| 2004/0212318 | A1 | 10/2004 | Hamamoto et al. |
| 2005/0116667 | A1 | 6/2005 | Mueller et al. |
| 2005/0128751 | A1 | 6/2005 | Roberge et al. |
| 2005/0236263 | A1 | 10/2005 | Mazur |
| 2005/0237341 | A1 | 10/2005 | Gangnet et al. |
| 2005/0278778 | A1 | 12/2005 | D'Agostino et al. |
| 2006/0002309 | A1 | 1/2006 | Ban |
| 2006/0044800 | A1 | 3/2006 | Reime |
| 2006/0047132 | A1 | 3/2006 | Shenai-Khatkhate et al. |
| 2006/0049935 | A1 | 3/2006 | Giannopoulos et al. |
| 2006/0139907 | A1 | 6/2006 | Yen |
| 2006/0198157 | A1 | 9/2006 | Ruan |
| 2006/0280660 | A1 | 12/2006 | Weiss |
| 2007/0085863 | A1 | 4/2007 | Moriya et al. |
| 2007/0119484 | A1 | 5/2007 | Kwon et al. |
| 2007/0145915 | A1 | 6/2007 | Roberge et al. |
| 2007/0182367 | A1 | 8/2007 | Partovi |
| 2007/0223219 | A1 | 9/2007 | Medenporp et al. |
| 2008/0006709 | A1 | 1/2008 | Ashworth et al. |
| 2008/0049043 | A1 | 2/2008 | Titmuss et al. |
| 2008/0062192 | A1 | 3/2008 | Voliter et al. |
| 2008/0092800 | A1 | 4/2008 | Smith et al. |
| 2008/0106887 | A1 | 5/2008 | Salsbury et al. |
| 2008/0143273 | A1 | 6/2008 | Davidson et al. |
| 2008/0198175 | A1 | 8/2008 | Sun et al. |
| 2008/0218099 | A1 | 9/2008 | Newman |
| 2008/0265799 | A1 | 10/2008 | Sibert |
| 2009/0052182 | A1 | 2/2009 | Matsuba et al. |
| 2009/0059603 | A1 | 3/2009 | Recker et al. |
| 2009/0121651 | A1 | 5/2009 | Gandhi |
| 2009/0128059 | A1 | 5/2009 | Joosen et al. |
| 2009/0146982 | A1 | 6/2009 | Thielman et al. |
| 2009/0147508 | A1 | 6/2009 | Bertram et al. |
| 2009/0190338 | A1 | 7/2009 | Huang |
| 2009/0251127 | A1 | 10/2009 | Kim |
| 2009/0284169 | A1 | 11/2009 | Valois |
| 2009/0295310 | A1 | 12/2009 | Duerr et al. |
| 2010/0068899 | A1 | 3/2010 | Shvili |
| 2010/0070217 | A1 | 3/2010 | Shimada et al. |
| 2010/0118527 | A1 | 5/2010 | Choong |
| 2010/0127638 | A1 | 5/2010 | Lan et al. |
| 2010/0141153 | A1 | 6/2010 | Recker et al. |
| 2010/0172120 | A1 | 7/2010 | Wegh et al. |
| 2010/0194687 | A1 | 8/2010 | Corson et al. |
| 2010/0204841 | A1 | 8/2010 | Chemel et al. |
| 2010/0207534 | A1 | 8/2010 | Dowling et al. |
| 2010/0277067 | A1 | 11/2010 | Maxik et al. |
| 2010/0289664 | A1 | 11/2010 | Mizushima et al. |
| 2010/0296285 | A1 | 11/2010 | Chemel et al. |
| 2010/0301773 | A1 | 12/2010 | Chemel et al. |
| 2010/0327766 | A1 | 12/2010 | Recker et al. |
| 2011/0050120 | A1 | 3/2011 | Leung et al. |
| 2011/0074672 | A1 | 3/2011 | Diederiks et al. |
| 2011/0089838 | A1 | 4/2011 | Pickard et al. |
| 2011/0089842 | A1 | 4/2011 | Aldrich et al. |
| 2011/0095687 | A1 | 4/2011 | Jonsson |
| 2011/0109216 | A1 | 5/2011 | Kang et al. |
| 2011/0109249 | A1 | 5/2011 | Liu et al. |
| 2011/0133655 | A1 | 6/2011 | Recker et al. |
| 2011/0161865 | A1 | 6/2011 | Josephsoon et al. |
| 2011/0163683 | A1 | 7/2011 | Steele et al. |
| 2011/0199004 | A1 | 8/2011 | Henig et al. |
| 2011/0216085 | A1 | 9/2011 | Bergman et al. |
| 2011/0227469 | A1 | 9/2011 | Yuan et al. |
| 2011/0227495 | A1 | 9/2011 | Guest et al. |
| 2011/0234366 | A1 | 9/2011 | Feng et al. |
| 2011/0260648 | A1 | 10/2011 | Hamamoto et al. |
| 2011/0285515 | A1 | 11/2011 | Fushimi et al. |
| 2011/0309769 | A1 | 12/2011 | Kuroki et al. |
| 2012/0025717 | A1 | 2/2012 | Klusmann et al. |
| 2012/0026726 | A1 | 2/2012 | Recker et al. |
| 2012/0080944 | A1 | 4/2012 | Recker et al. |
| 2012/0120243 | A1 | 5/2012 | Chien |
| 2012/0126699 | A1 | 5/2012 | Zittel |
| 2012/0130547 | A1 | 5/2012 | Fadell et al. |
| 2012/0146505 | A1 | 6/2012 | Jonsson |
| 2012/0147604 | A1 | 6/2012 | Farmer |
| 2012/0153868 | A1 | 6/2012 | Gu et al. |
| 2012/0188172 | A1 | 7/2012 | Fong |
| 2012/0195053 | A1 | 8/2012 | Wu |
| 2012/0206050 | A1 | 8/2012 | Spero |
| 2012/0218407 | A1 | 8/2012 | Chien |
| 2012/0218421 | A1 | 8/2012 | Chien |
| 2012/0224381 | A1 | 9/2012 | Hashimoto et al. |
| 2012/0281879 | A1 | 11/2012 | Vlutters et al. |
| 2012/0287488 | A1 | 11/2012 | Oto |
| 2012/0287601 | A1 | 11/2012 | Pickard et al. |
| 2012/0293652 | A1 | 11/2012 | Farmer |
| 2012/0299476 | A1 | 11/2012 | Roberts et al. |
| 2012/0300441 | A1 | 11/2012 | Thomas et al. |
| 2012/0306377 | A1 | 12/2012 | Igaki et al. |
| 2013/0021795 | A1 | 1/2013 | Chien |
| 2013/0038230 | A1 | 2/2013 | Brown et al. |
| 2013/0049598 | A1 | 2/2013 | Nagashima et al. |
| 2013/0063042 | A1 | 3/2013 | Bora et al. |
| 2013/0099672 | A1 | 4/2013 | Lin et al. |
| 2013/0106283 | A1 | 5/2013 | Gillio |
| 2013/0113715 | A1 | 5/2013 | Grant et al. |
| 2013/0121569 | A1 | 5/2013 | Yadav |
| 2013/0148341 | A1 | 6/2013 | Williams |
| 2013/0154985 | A1 | 6/2013 | Miyazaki |
| 2013/0193847 | A1 | 8/2013 | Recker et al. |
| 2013/0249392 | A1 | 9/2013 | Kim |
| 2013/0249435 | A1 | 9/2013 | Hellkamp |
| 2013/0257312 | A1 | 10/2013 | Maxik et al. |
| 2013/0264943 | A1 | 10/2013 | Bora et al. |
| 2013/0278132 | A1 | 10/2013 | Yuan et al. |
| 2013/0278162 | A1 | 10/2013 | Watson et al. |
| 2013/0278172 | A1 | 10/2013 | Maxik et al. |
| 2013/0292106 | A1 | 11/2013 | Lien |
| 2013/0314680 | A1 | 11/2013 | Yamamura |
| 2013/0326381 | A1 | 12/2013 | Pereira et al. |
| 2014/0021862 | A1 | 1/2014 | Chung |
| 2014/0028199 | A1 | 1/2014 | Chemel |

(56) References Cited

U.S. PATENT DOCUMENTS

2014/0029749 A1 1/2014 Malasani
2014/0043825 A1 2/2014 Brandes et al.
2014/0046152 A1 2/2014 Bechtel et al.
2014/0049983 A1 2/2014 Nichol et al.
2014/0084809 A1 3/2014 Catalano
2014/0097071 A1 4/2014 Park et al.
2014/0117859 A1 5/2014 Swatsky et al.
2014/0118385 A1 5/2014 Buckley et al.
2014/0152188 A1 6/2014 Bora et al.
2014/0159600 A1 6/2014 Sutardja et al.
2014/0184577 A1 7/2014 Kim et al.
2014/0239811 A1 8/2014 Kreiner et al.
2014/0265864 A1 9/2014 Hickok et al.
2014/0265881 A1 9/2014 Karc et al.
2014/0265900 A1 9/2014 Sadwick et al.
2014/0273715 A1 9/2014 Moll et al.
2014/0273892 A1 9/2014 Nourbakhsh
2014/0285999 A1 9/2014 Luna et al.
2014/0300293 A1 10/2014 Ruan et al.
2014/0300294 A1 10/2014 Zampini et al.
2014/0321122 A1 10/2014 Domagala et al.
2014/0354150 A1 12/2014 Joseph et al.
2015/0015165 A1 1/2015 Engelen et al.
2015/0038246 A1 2/2015 Zeid
2015/0048760 A1 2/2015 Kwag et al.
2015/0062892 A1 3/2015 Krames et al.
2015/0084513 A1 3/2015 Anthony et al.
2015/0084515 A1 3/2015 Altamura et al.
2015/0103515 A1 4/2015 Bosua et al.
2015/0103520 A1 4/2015 Fournier et al.
2015/0108904 A1 4/2015 Chen
2015/0130359 A1 5/2015 Bosua et al.
2015/0141755 A1 5/2015 Tesar
2015/0189721 A1 7/2015 Karc et al.
2015/0208900 A1 7/2015 Mdas et al.
2015/0236225 A1 8/2015 David et al.
2015/0250042 A1 9/2015 Aggarwal et al.
2015/0325157 A1 11/2015 Jumblatt et al.
2015/0325163 A1 11/2015 Kobayashi
2015/0345764 A1 12/2015 Hussey et al.
2015/0359061 A1 12/2015 Adler
2015/0382463 A1 12/2015 Kim et al.
2016/0007431 A1 1/2016 Bosua et al.
2016/0030610 A1 2/2016 Peterson et al.
2016/0061396 A1 3/2016 Bosua et al.
2016/0066387 A1 3/2016 Darton et al.
2016/0066393 A1 3/2016 Bosua
2016/0066397 A1 3/2016 Alexander et al.
2016/0073474 A1 3/2016 Van et al.
2016/0073479 A1 3/2016 Erchak et al.
2016/0100086 A1 4/2016 Chien
2016/0264054 A1 9/2016 Uken et al.
2016/0286627 A1 9/2016 Chen et al.
2016/0364854 A1 12/2016 Wieser
2017/0118815 A1 4/2017 Altamura et al.
2017/0163439 A1 6/2017 Bosua et al.
2017/0231072 A1 8/2017 Bosua et al.
2017/0309215 A1 10/2017 Perdices-Gonzalez et al.
2017/0310940 A1 10/2017 Perdices-Gonzalez et al.
2017/0310956 A1 10/2017 Perdices-Gonzalez et al.
2017/0347422 A1 11/2017 Wang et al.
2018/0005590 A1 1/2018 Komanduri et al.
2018/0022274 A1 1/2018 Kincade et al.
2018/0177033 A1 6/2018 Alexander et al.
2018/0240418 A1 8/2018 Kobayashi
2019/0008025 A1 1/2019 Alexander et al.
2019/0034106 A1 1/2019 Shin et al.
2019/0200438 A1 6/2019 Alexander et al.
2019/0254137 A1 8/2019 Sevo et al.
2020/0163192 A1 5/2020 Alexander et al.
2020/0375014 A1 11/2020 Alexander et al.
2020/0389951 A1 12/2020 Bosua et al.
2021/0192936 A1 6/2021 Bosua et al.

FOREIGN PATENT DOCUMENTS

CN 101897236 A 11/2010
CN 201662712 U 12/2010
CN 201758454 U 3/2011
CN 201986217 U 9/2011
CN 102573220 A 7/2012
CN 103067492 A 4/2013
CN 203099410 U 7/2013
WO 2007/095740 A1 8/2007
WO 2014/040118 A1 3/2014
WO 2014/101321 A1 7/2014

OTHER PUBLICATIONS

Boost Your Sales Immediately, Add An LED Display From Cirrus, Cirrus LED, (Year: 2016), (9 pages), [Retrieved from the Internet Jan. 26, 2018] <URL: https://cirrusled.com!>.
Clover, Juli. "Review: Nanoleaf's 'Aurora Smarter Kit' Offers Awesome HomeKit—Enabled Mood Lighting for $200," Nanoleaf Aurora Light Panels Review—MacRumors, Nov. 16, 2018, (17 pages), [Retrieved from the Internet Jan. 26, 2018] <URL: https://www.macrumors.com/review/nanoleaf-aurora-smarter-kit/>.
Communication about intention to grant a European patent Mailed on Jan. 10, 2020 for EP Application No. 15795745, 6 page(s).
Decision to grant a European patent Mailed on Mar. 26, 2020 for EP Application No. 15795745, 2 page(s).
EP Office Action Mailed on Jul. 31, 2018 for EP Application No. 15795745, 5 page(s).
European search report Mailed on Nov. 21, 2017 for EP Application No. 15795745, 7 page(s).
International Preliminary Report on Patentability for International Application No. PCT/US2014/065799, dated May 26, 2016, (9 pages), The International Bureau of WIPO, Geneva, Switzerland.
International Search Report and Written Opinion for International Application No. PCT/US2014/065799, dated Feb. 20, 2015, (11 pages), United States Patent and Trademark Office, US.
Non-Final Rejection Mailed on Oct. 13, 2023 for U.S. Appl. No. 17/191,539, 17 page(s).
Reyes Kimberly, User Story: Grain Lighting, Oct. 21, 2013, https://www.typeamachines.com/additive-manufacturing/user-story-grain-lighting.
The Light with the Power to Boost your Defense Against Bacteria, Ellumi Lighting, LED Genrn Killing Disinfection ighting, https://www.ellumilighting.com, downloaded Sep. 25, 2020.
United States Patent and Trademark Office, Non-Final Office Action received for U.S. Appl. No. 17/191,539, dated Feb. 8, 2023, 17 pages, US.
Non-Final Rejection Mailed on Jan. 22, 2025 for U.S. Appl. No. 18/6354,449, 12 page(s).

LIGHTING SYSTEM

CROSS-REFERENCE TO RELATED APPLICATIONS

This application is a continuation of U.S. patent application Ser. No. 17/191,539, filed Mar. 3, 2021, which is a continuation of U.S. patent application Ser. No. 14/843,828, filed Sep. 2, 2015 (now U.S. Pat. No. 11,455,884, issued Sep. 27, 2022), which claims the benefit of U.S. Provisional Application No. 62/044,789, filed Sep. 2, 2014, each of which is incorporated in its entirety by this reference.

TECHNICAL FIELD

This invention relates generally to the lighting systems field, and more specifically to a new and useful low manufacturing cost, dynamically adjustable lighting system in the lighting systems field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
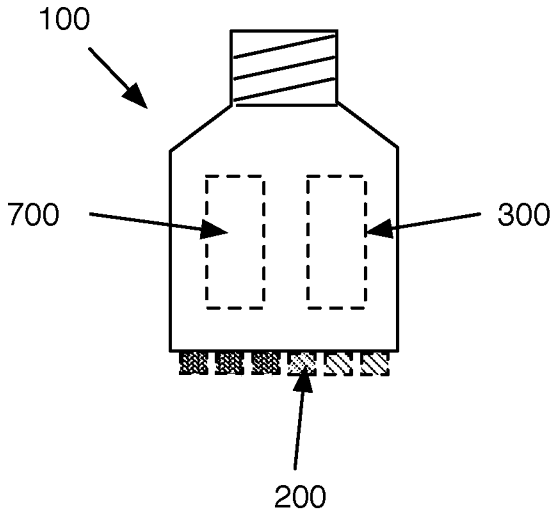
FIG. 1 is a schematic representation of the lighting system.

As shown in FIG. 1, the lighting system 100 includes multiple sets of electromagnetic signal emitting elements and a processor 300 configured to control operation of the multiple sets of EM signal emitting elements 200. The lighting system 100 functions to emit electromagnetic signals, such as light, having at least one, more preferably at least two, adjustable properties, wherein the adjustable properties can be color temperature, wavelength, intensity, or any other suitable electromagnetic property. The lighting system 100 is preferably a light bulb, but can alternatively be incorporated into any other suitable component or utilized in any other suitable application.

1. Benefits

The lighting system 100 confers several benefits over conventional lighting systems. First, by using multiple sets of light emitting elements that have substantially fixed emission properties that are substantially cheaper than light emitting elements having variable emission properties, the lighting system 100 enables dynamic adjustment of the properties of the resultant light emitted by the lighting system 100 as a whole. Second, by incorporating sets of light emitting elements having emission properties outside of the human-visible spectrum (e.g., outside of approximately 390 to 700 nm), the lighting system 100 can enable higher-resolution imaging at the respective wavelengths. For example, incorporating a set of infrared emitting elements into the lighting system 100 can enable better IR imaging resolution for security, low-light monitoring, or thermo-monitoring applications. Third, by incorporating EM signal emitting elements 200 having at least one or more variable parameters, the lighting system 100 enables dynamic aesthetic adjustment to substantially match or accommodate for the EM signal quality (e.g., light quality) emitted by previously installed systems in the space.

2.1 Electromagnetic Signal Emitting Elements

The electromagnetic signal emitting element 200 (EM signal emitting element) of the lighting system 100 is configured to emit electromagnetic signals having a set of properties. The EM signal emitting element 200 (or combination thereof) can function to illuminate a physical area with light having a specified set of properties. The EM signal emitting element 200 (or combination thereof) can additionally or alternatively function communicate data to other systems (e.g., devices, appliance 20 s, other lighting system 100 s) within a communication range. However, the EM signal emitting element 200 can perform any other suitable functionality.

The EM signal emitting element 200 can include an active surface configured to emit the EM signal, but can alternatively emit the signal in any other suitable manner. The EM signal emitting element 200 is preferably mounted to the substrate 400, more preferably a broad face of the substrate 400, but can alternatively be mounted to the sides of the substrate 400, the diffuser, or to any other suitable lighting system 100 component.

The EM signal emitting element 200 preferably has fixed EM signal properties values, but can alternatively have variable EM signal property values. Alternatively, a limited subset of EM signal properties can have variable values, while the remaining EM signal properties of the set can have fixed values. For example, pulse frequency-independent properties, pulse width-independent properties, current-independent properties, voltage independent properties, or any other suitable subset of the property set can have fixed and/or variable values. When the electromagnetic property has a fixed value, the value is preferably fixed within a margin of error (e.g., 5% variation, manufacturing variation, etc.) of an original value, manufacturing value, specification value, or any other suitable value. The electromagnetic parameters are preferably light parameters, but can alternatively be thermal parameters, audio parameters, or any other suitable parameter. The light parameters can be light properties (e.g., wavelength, propagation direction, intensity, and frequency), color parameters (e.g., hue, saturation, color temperature, etc.), or include any other light parameter. However, any other suitable parameter can be fixed or varied.

For example, the EM signal emitting element 200 can have a fixed wavelength and a variable intensity (e.g., wherein the element is dimmable, wherein the intensity is a current-dependent property). In a specific example, the EM signal emitting element 200 (e.g., light emitting element) can only emit visible light having a fixed color temperature. Alternatively, the EM signal emitting element 200 can only emit an invisible signal (e.g., IR light, RF signal). However, the EM signal emitting element 200 can emit one or more wavelengths of light (concurrently or individually) or have any other suitable set of capabilities.

The EM signal emitting element 200 can emit light (e.g., visible light, invisible light, such as IR, UV, etc.), RF, microwave, or any other suitable electromagnetic signal. Alternatively or additionally, the lighting system 100 can include a sound or pressure wave emitter configured to emit a sound or pressure wave signal, or include any other suitable emitter. The sound or pressure wave signal can be an ultrasound signal, infrasound signal, or any other suitable sound or pressure wave signal. The EM signal emitting elements 200 (e.g., light emitting elements) are preferably light emitting diodes (LEDs), but can alternatively be organic light emitting diodes (OLEDs), incandescent light bulbs, resistors, or any other suitable element configured to emit radiation. The light emitting elements can be visible light emitting elements 210, invisible light emitting elements 230, or emit light having any suitable property. The light emitting elements can emit a single wavelength of light (e.g., be a white LED, red LED, green LED, blue LED, cyan LED, IR LED, etc.), emit multiple wavelengths of light (e.g., be an RGB LED, RGBW LED 3-4 channel, etc.), or emit any suitable number of wavelengths. The EM signal emitting elements 200 within a set are preferably substantially similar, but can alternatively be different. The EM signal emitting elements 200 in different sets are preferably substantially similar, but can alternatively be different.

The lighting system 100 preferably includes a plurality of EM signal emitting elements 200, but can alternatively include a single EM signal emitting element 200 or any suitable number of EM signal emitting elements 200. The plurality of EM signal emitting elements 200 is preferably divided into multiple sets of EM signal emitting elements 200 (e.g., one set, two sets, three sets, any other suitable number of sets), but can alternatively be controlled as the plurality. Each set of EM signal emitting elements 200 preferably includes multiple EM signal emitting elements 200, but can alternatively include a single EM signal emitting element 200. Every set of EM signal emitting elements 200 preferably has the same number of EM signal emitting elements 200, but can alternatively have different numbers of EM signal emitting elements 200.

For example, a first set of light emitting elements 200 can be low lumen-output elements, while the second set of light emitting elements 200' can be high lumen-output elements, wherein the first set includes more light emitting elements to match the lumen output of the second set of light emitting elements. However, any suitable number of light emitting element having any other suitable property can be used.

Each set of EM signal emitting elements 200 preferably emits EM signals having at least one property that is different from the remaining sets of EM signal emitting elements 200 (e.g., different wavelength, frequency, propagation direction, etc.), but can alternatively have the same EM signal properties. All EM signal emitting elements 200 within a set can have substantially the same EM signal properties (e.g., within manufacturing error), share one or more EM signal property values (e.g., the same wavelength, phase, etc.), have entirely different electromagnetic property values, or have any other suitable set of EM signal property values. The parameter values associated with the different EM signal emitting element sets are preferably separated by a threshold value difference (e.g., opposing sides of a color spectrum, etc.), but can alternatively be differentiated in any other suitable manner.

The multiple sets of EM signal emitting elements 200 are preferably arranged in a pattern along a substrate 400 of the lighting system 100, but can alternatively be randomly arranged. The EM signal emitting elements 200 are preferably substantially evenly distributed across the substrate 400, but can alternatively be unevenly distributed, such that the substrate 400 includes portions with high concentrations of EM signal emitting elements 200, and other portions with low concentrations of EM signal emitting elements 200. The EM signal emitting element sets can be substantially evenly distributed across the substrate 400, be unevenly distributed across the substrate 400, or be otherwise distributed across the substrate 400.

Figure 3:
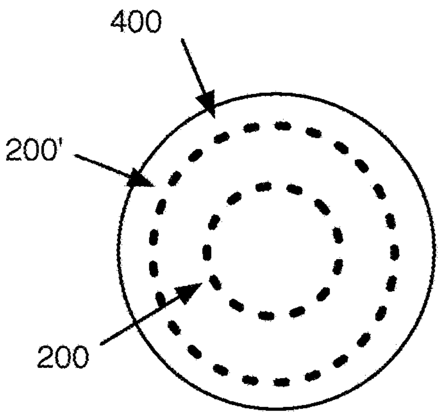
FIGS. 3, 4, 5, 6, 7, and 8 are schematic representations of a first, second, third, fourth, fifth, and sixth variation of the arrangement of the EM signal emitting element sets on the substrate, respectively.
Figure 4:
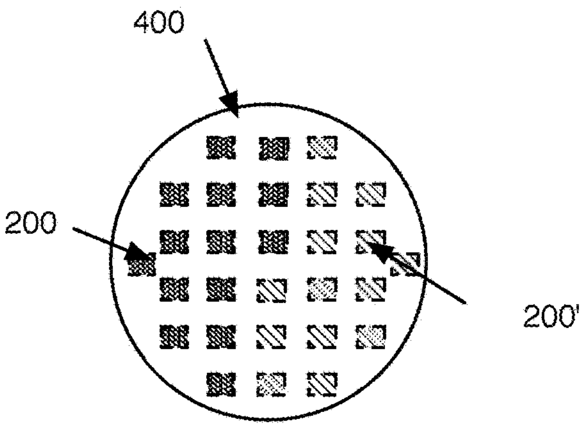
Figure 5:
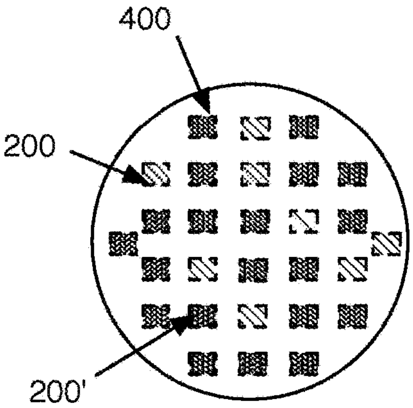
Figure 6:
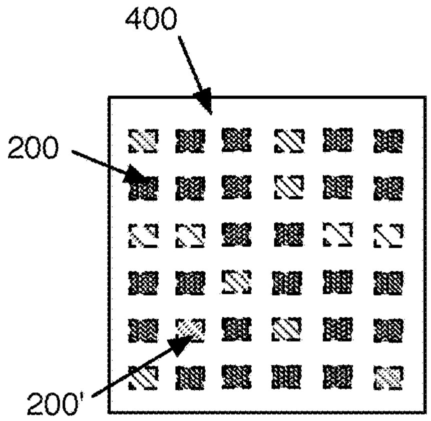
Figure 7:
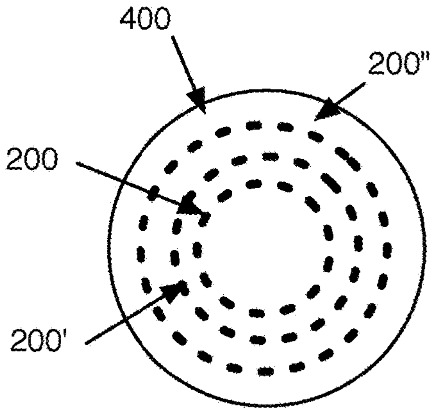
Figure 8:
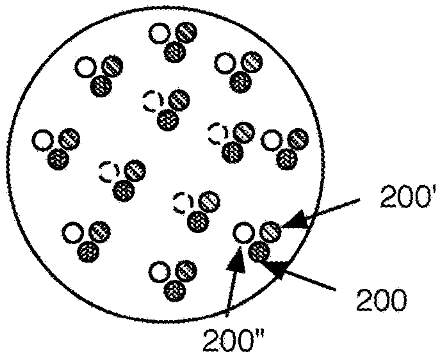

In a first variation, the EM signal emitting element sets are concentrically arranged, as shown in FIGS. 3 and 7, wherein different EM signal emitting element sets can be arranged at different radial positions. In a second variation, the EM signal emitting element sets are arcuately arranged, wherein different EM signal emitting element sets can be arranged in different arcuate sections. In a third variation, the EM signal emitting elements 200 of the sets are randomly distributed (as shown in FIG. 5 and FIG. 6), and can be isotropically or non-isotropically distributed over the substrate 400. In a fourth variation, different EM signal emitting element sets are arranged within different contiguous portions of the substrate 400 (as shown in FIG. 4), wherein the contiguous portions preferably do not overlap, but can alternatively overlap. In a fifth variation as shown in FIG. 8, an EM signal emitting element 200 from each of a plurality of EM signal emitting element sets is included in a group, wherein the lighting system 100 includes multiple groups and the groups are evenly distributed across the substrate 400 (dashed elements optional). In a sixth variation, one or more EM signal emitting element sets can be arranged in the central portion of the substrate 400 (e.g., the central portion of the substrate 400 mounting face), and different EM signal emitting element 200 set(s) can be arranged along the perimeter of the substrate 400 (e.g., evenly or unevenly distributed along the perimeter). However, the multiple sets of EM signal emitting elements 200 can be otherwise arranged on the substrate 400.

The EM signal emitting elements 200 of a set are preferably connected in parallel, but can alternatively be connected in series. Different sets of EM signal emitting elements 200 are preferably connected in parallel to the power source by a set of switches, but can alternatively or additionally be connected to different power control circuits or connected in any other suitable manner.

Figure 12:
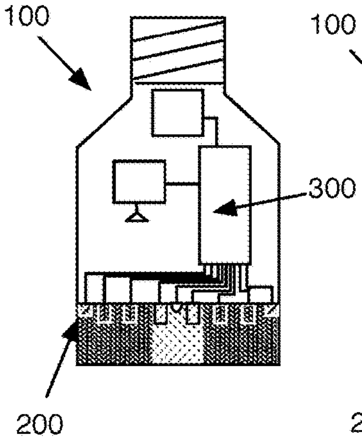
FIGS. 12 and 13 are schematic representations of lighting systems with individually indexed EM signal emitting elements and individually indexed EM signal emitting element sets, respectively.
Figure 13:
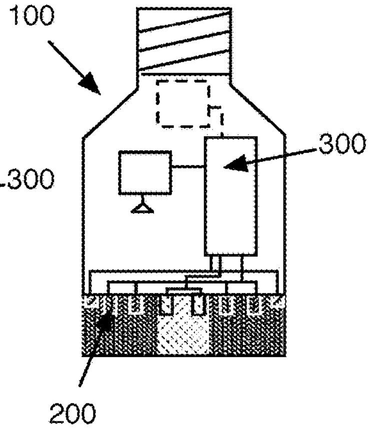

Each EM signal emitting element 200 of a set can be independently indexed (e.g., as shown in FIG. 12) and controlled, indexed and controlled together with the other EM signal emitting elements 200 of the set (e.g., as shown in FIG. 13), indexed and controlled together with a subset of the light emitting elements of the set, or controlled in any other suitable manner. Each set of EM signal emitting elements 200 is preferably independently indexed and controlled, but can alternatively be controlled with another set of EM signal emitting elements 200. The EM signal emitting elements 200 of a subset can be EM signal emitting elements 200 of the same set or EM signal emitting elements 200 of different sets. The EM signal emitting elements 200 of the subset can be related by physical arrangement on the substrate 400 (e.g., EM signal emitting elements 200 aligned along a vector, such as a radial vector, longitudinal vector, lateral vector, or other vector; EM signal emitting elements 200 arranged within a section of the substrate 400, such as an arcuate section, etc.), be otherwise related, or be unrelated.

The EM signal emitting elements 200 are preferably indexed during or after manufacturing, but can alternatively be indexed in response to installation (e.g., into an appliance 20, a light fixture, or other power-connected component) or at any other suitable time. The index is preferably used to identify the EM signal emitting element 200, but can alternatively be used to determine parameters about the EM signal emitting element 200, or be used in any other suitable manner.

For example, the index can be used to determine the EM signal emitting element 200 location relative to a reference point. The reference point is preferably a lighting system 100 reference point on the lighting system 100 (e.g., an EM signal emitting element 200, a center point, etc.), wherein the location of the EM signal emitting element 200 relative to the lighting system 100 reference point can be predetermined by the manufacturer or otherwise known. The position of the lighting system 100 reference point relative to an external reference point can be determined and used to select the EM signal emitting elements 200 that should be selectively powered. Alternatively, the reference point can be an external reference point, such as a point in a room, a geographic location, compass direction, or any other suitable external reference point.

In one example, the lighting system 100 can include a first set of light emitting elements configured to emit light having a first color temperature (e.g., above 5,000K or any other suitable color temperature), and a second set of light emitting elements configured to emit light having a second color temperature (e.g., below 5,000K, between 2,700-3,000K, or any other suitable color temperature). However, the light emitting elements can be configured to emit light having any other suitable color temperature.

In a second example, the lighting system 100 can include a first set of light emitting elements configured to emit light at a first wavelength and a second set of light emitting elements configured to emit light at a second wavelength. In one variation, the first and second wavelengths are both within the visible spectrum (e.g., red and blue, respectively). In another variation, the first wavelength is in the visible spectrum and the second wavelength is outside of the visible spectrum (e.g., IR, UV, etc.). However, the light emitting elements can be configured to emit light at any other suitable wavelength.

In a third example, the lighting system 100 can include: a first set of light emitting elements configured to emit visible light having a first fixed wavelength of visible light (e.g., white light having a fixed color temperature above 5,000 K or any other suitable color temperature); a second set of light emitting elements configured to emit visible light having a second fixed wavelength of visible light (e.g., white light having a fixed color temperature below 5,000K, between 2,700-3,000K, or any other suitable color temperature); and a third set of light emitting elements 200" configured to emit a fixed wavelength of invisible light (e.g., IR light). The first, second, and third sets of light emitting elements can each be individually controlled (e.g., wherein the intensity of light emitted by the one set is independent from the intensity of light emitted by the other sets), or be controlled together (e.g., wherein the intensity of light emitted by the one set is dependent upon the intensity of light emitted by one or more of the other sets). Each element or sub-group of the first, second, and/or third set can be independently indexed and controlled. Alternatively, all elements of a set are controlled together. However, the light emitting elements can be configured to emit light having any other suitable property, and can be controlled in any suitable manner.

2.2 Processor

The processor 300 of the lighting system 100 functions to control EM signal emitting element 200 operation based on lighting instructions received from a device. The processor 300 can individually control the relative intensities of EM signals emitted by different EM signal emitting element sets (e.g., by controlling power provision to the multiple EM signal emitting element sets). In one variation, the processor 300 can individually control a first and second set of light emitting elements to cooperatively emit light having a target color parameter value (e.g., wherein the light emitted by the first and second light emitting element are mixed by the diffuser to achieve the target light parameters). The processor 300 can additionally or alternatively receive control instructions 30 for an external device (e.g., appliance 20), control an EM signal emitting element 200 or set thereof to communicate the control instructions 30 to a local external device, translate the control instructions 30 from one communication protocol to another communication protocol, or perform any other suitable functionality.

The processor 300 is preferably electrically connected to every EM signal emitting element 200 of the lighting system 100, but can alternatively be electrically connected to a subset of the EM signal emitting elements 200 of a set; be electrically connected to some EM signal emitting element sets but not connected to other EM signal emitting element sets; or be electrically connected to any suitable set of EM signal emitting elements 200. The processor 300 can additionally or alternatively be connected to the communication module 700, sensor(s), power storage system 800, base, or any other suitable lighting system 100 component.

The processor 300 preferably controls power provision to the EM signal emitting elements 200 and/or communicates information to external devices using the EM signal emitting elements 200 by controlling the pulse rate of the EM signal emitting elements 200 (e.g., by controlling the PWM rate of the LED), but can alternatively control power provision and/or communicate information by controlling the current provided to the EM signal emitting element 200 or controlling any other suitable parameter of the power provided to the EM signal emitting element 200. The external device can be a remote device (e.g., outside of a communication range for the EM signal, protocol, etc., physically separated from the lighting system 100 by a wall or other EM barrier 90, outside of a line of sight, etc.), a collocated device (e.g., connected to the lighting system 100 by a wire), or any other suitable device. The processor 300 can additionally function to record lighting system 100 data and send the lighting system 100 data to a device. The processor 300 is preferably a PCB, but can alternatively be any other suitable computing unit.

The processor 300 can additionally include a power conversion module that functions to convert power source power to power suitable for the EM signal emitting element 200. The power conversion module can be a voltage converter, power conditioning circuit, or any other suitable circuit.

The processor 300 can additionally include digital memory that functions to store settings. The settings can be for each EM signal emitting element 200, each set of EM signal emitting elements 200, the desired parameters of the cumulative light output, or any other suitable setting. The memory is preferably volatile, but can alternatively be any other suitable memory.

2.3 Substrate

The substrate 400 of the lighting system 100 functions to mechanically support and mount the EM signal emitting elements 200. The substrate 400 can additionally function to supply power and/or operation instructions to the EM signal emitting elements 200 from the processor 300 or power supply (e.g., lightbulb base or power storage system 800). The substrate 400 is preferably mounted to an end of the housing 510, and is preferably encapsulated between the housing 510 and the cover (e.g., the diffuser). However, the substrate 400 can be arranged in any other suitable position within the lighting system 100. The substrate 400 is preferably a PCB, but can alternatively be any other suitable surface.

Figure 2:
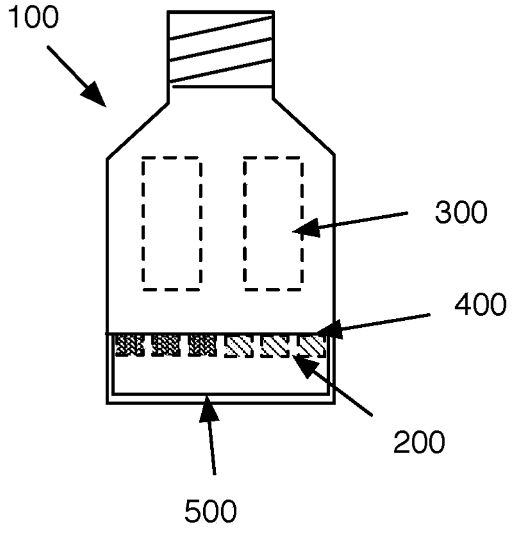
FIG. 2 is a schematic representation of a first variation of the lighting system, including a cover.

The substrate 400 preferably defines a first broad face, and can additionally define a second broad face opposing the first broad face, sides, or define any other suitable surface. The EM signal emitting elements 200 are preferably mounted to a single broad face (e.g., the first broad face), but can alternatively be mounted to the sides, the second broad face, or to any other suitable portion of the substrate 400. The substrate profile (e.g., cross section) preferably mirrors that of the housing 510, but can alternatively be different. The substrate profile can be circular, polygonal, irregular, or be any other suitable shape. The substrate 400 can be substantially flat (planar), as shown in FIG. 2, curved (e.g., concave, convex, semi-spherical, etc.), as shown in FIG. 8, polygonal (e.g., cylindrical, cuboidal, pyramidal, octagonal, etc.), or have any other suitable configuration. The substrate 400 can be rigid, flexible, or have any other suitable material property.

The substrate 400 is preferably reflective or can additionally include a reflector, such that light directed toward the substrate 400 from the light emitting elements can be reflected away from the substrate 400. The reflector can be substantially flat, curved, or have any other suitable configuration. The reflector can be textured, smooth, or have any other surface feature. However, the substrate 400 can be matte, dark (e.g., such that the reflected light is absorbed), or have any other suitable property.

2.4 Cover and Housing

As shown in FIG. 2, the lighting system 100 can additionally include a cover 500 that functions to cooperatively encapsulate the EM signal emitting elements 200 with the substrate 400. The cover 500 can function to mechanically protect the EM signal emitting elements 200. The cover 500 can function to change the properties of EM signals emitted by the elements. The cover 500 is preferably arranged proximal the first broad face of the substrate 400, but can alternatively be otherwise arranged.

The cover 500 and substrate 400 (or housing 510) preferably cooperatively entirely encapsulate the EM signal emitting elements 200, but can alternatively partially encapsulate the EM signal emitting elements 200 or encapsulate any other suitable portion of the light emitting elements. The cover 500 can be transparent, opaque, translucent, or have any other suitable optical property. The cover 500 can trace the substrate 400 profile or have a different profile. The cover 500 can be cylindrical (e.g., with rounded corners), convex, or have any other suitable shape. The cover 500 can be arranged with a broad face substantially perpendicular the active face(s) of the EM signal emitting elements 200, the broad face of the substrate 400, or arranged in any other suitable configuration. The cover 500 can be made of plastic, metal, ceramic, or any other suitable material.

The cover 500 can additionally function as a diffuser, or the system can additionally include a diffuser. The diffuser functions to diffuse and blend the light emitted by the individual EM signal emitting elements 200 or different EM signal emitting element sets. The diffuser is preferably translucent and diffuses light, but can alternatively be a color filter or include any other suitable optical property.

Figure 11:
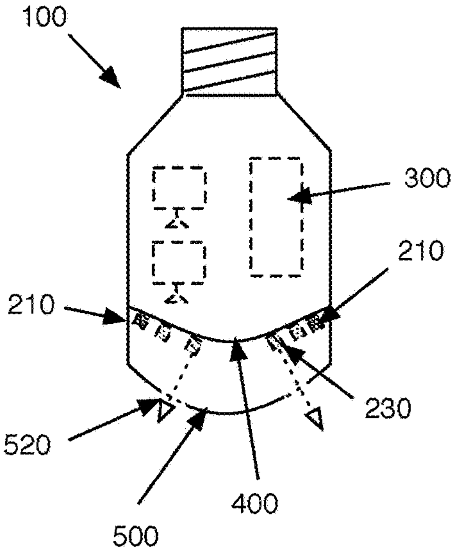
FIG. 11 is a schematic representation of a variation of the lighting system including a communication feature.

As shown in FIG. 11, the diffuser can additionally include a communication feature 520 that permits data to be communicated through the diffuser (e.g., using visible light, invisible light, another EM signal, or any other suitable wireless communication mechanism). The communication feature 520 can be an aperture through the diffuser thickness (e.g., a light pipe), a set of apertures or opaque features (e.g., printed dots) that selectively permit permeation of the communication wavelength but diffuses EM signals of other wavelengths, or be any other suitable feature that permits communication therethrough. The communication feature can be arranged along the entirety of the diffuser side, along a portion of the diffuser side (e.g., portion proximal the housing 510, portion distal the housing 510), along a broad face of the diffuser (e.g., along the flat surface of the diffuser), along a diffuser edge, extend along the entirety or portion of the diffuser arcuate face, or along any other suitable portion of the diffuser. The communication feature is preferably substantially aligned with a normal vector of the active surface of the EM signal emitting element 200 communicating the information (e.g., an IR LED), but can alternatively be at an angle to the normal vector, or be arranged in any other suitable configuration.

The lighting system 100 can additionally include a housing 510 that functions to encapsulate, protect, and support the lighting system components. The housing 510 can additionally or alternatively be thermally coupled to and function as a heat sink for the lighting system 100 components. The housing 510 is preferably mounted proximal the second broad face of the substrate 400, but can alternatively be mounted to the first broad face or be otherwise arranged. The housing 510 can be made of metal, ceramic, plastic, or any other suitable material.

The housing 510 can additionally include a base 512 that functions as a power supply. The base can function to physically retain and electrically connect the lighting system 100 to a light fixture. The base can be a standard light bulb base configured to connect to a standard light fixture (e.g., an Edison base, candelabra base, 2-pin base, 3-prong base, etc.), a custom base, or be any other suitable base. The base is preferably mounted to an end of the housing 510 opposing the substrate 400, but can alternatively be mounted to any other suitable portion of the housing 510. The base can be electrically connected to the processor 300, power storage system 800, EM signal emitting elements 200, sensors 600, communication modules 700, and/or other lighting system components, but can alternatively be electrically connected to any other suitable component.

2.5 Sensors

The lighting system 100 can additionally include a set of sensors 600 that function to measure ambient environment parameters, system parameters, or any other suitable parameter. These measurement values can be used to adjust EM signal emitting element 200 operation (e.g., adjust the intensity of emitted light, the color temperature of emitted light, turn the elements on or off, etc.), change communicated control information, interpret control information, or be used in any other suitable manner.

Sensors 600 can include position sensors 600 (e.g., accelerometer, gyroscope, etc.), location sensors 600 (e.g., GPS, cell tower triangulation sensors 600, triangulation system, trilateration system, etc.), temperature sensors 600, pressure sensors 600, light sensors 600 (e.g., camera, CCD, IR sensor, etc.), current sensors 600, proximity sensors 600, clocks, touch sensors 600, vibration sensors 600, or any other suitable sensor. The sensors 600 can be connected to and transmit data to the processor 300 and/or communication module 700.

2.6 Communication Module

The lighting system 100 can additionally include a communication module 700 that functions to communicate data to and from the lighting system 100 (e.g., as a transceiver). The communication module 700 preferably includes a receiver, and can additionally include a transmitter. The communication module 700 is preferably a wireless communication module 700, such as a Zigbee, Z-wave, or WiFi chip, but can alternatively be a short-range communication module 700, such as Bluetooth, BLE beacon, RF, IR, or any other suitable short-range communication module 700, a wired communication module 700, such as Ethernet or powerline communication, or be any other suitable communication module 700.

The communication module 700 can include an antenna 710 that functions to transmit or receive wireless data. The antenna 710 can extend through the substrate 400, extend along the housing 510 (e.g., along a longitudinal axis, about the housing perimeter, etc.), extend along the cover, or extend along any other suitable portion of the lighting system 100. The antenna 710 can extend through the thickness of the substrate 400 (e.g., from the second face to the first face), along or parallel a broad face of the substrate 400, at an angle through the substrate 400, or through any other suitable portion of the substrate 400. The antenna 710 can extend through a central portion of the substrate 400 (e.g., coaxially with the central axis, similar to that disclosed in U.S. application Ser. No. 14/512,669 filed 13 Oct. 2014, offset from the central axis, etc.), through a periphery of the substrate 400, or along any other suitable portion of the substrate 400.

The lighting system can include one or more communication modules. In variants including multiple communication modules (e.g., such that the lighting system is a multiradio system), each communication module can be substantially similar (e.g., run the same protocol), or be different. In a specific example, a first communication module can communicate with a remote router, while a second communication module functions as a border router for devices within a predetermined connection distance. The multiple communication modules can operate independently and/or be incapable of communicating with other communication modules of the same lighting system, or can operate based on another communication module of the lighting system (e.g., based on the operation state of, information communicated by, or other operation-associated variable of a second communication module). However, the lighting system can include any suitable number of communication modules connected and/or associated in any other suitable manner.

The lighting system 100 can additionally or alternatively include a router (e.g., a WiFi router), an extender for one or more communication protocols, a communication protocol translator, or include any other suitable communication module 700.

2.7 Power Storage System

Figure 14:
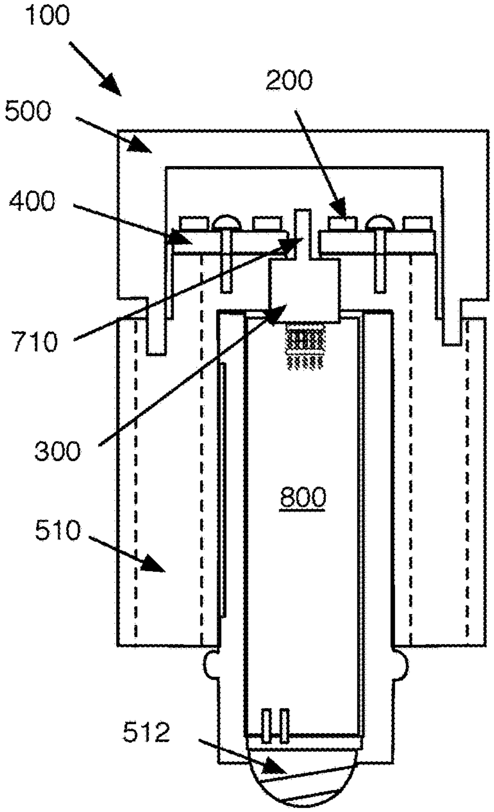
FIG. 14 is a schematic representation of a lighting system variant including a power storage device.

As shown in FIG. 14, the lighting system 100 can additionally include a power storage system 800 that functions to store power, provide power, and/or receive power. The power storage system 800 can be electrically connected to the processor 300, power supply (e.g., base), and/or other lighting system 100 components. The power storage system 800 can be arranged within the housing 510, arranged external the housing 510, or arranged in any other suitable position. The power storage system 800 can be a battery (e.g., a rechargeable secondary battery, such as a lithium chemistry battery; a primary battery), piezoelectric device, or be any other suitable energy storage, generation, or conversion system.

3. Lighting System Examples

Figure 9:
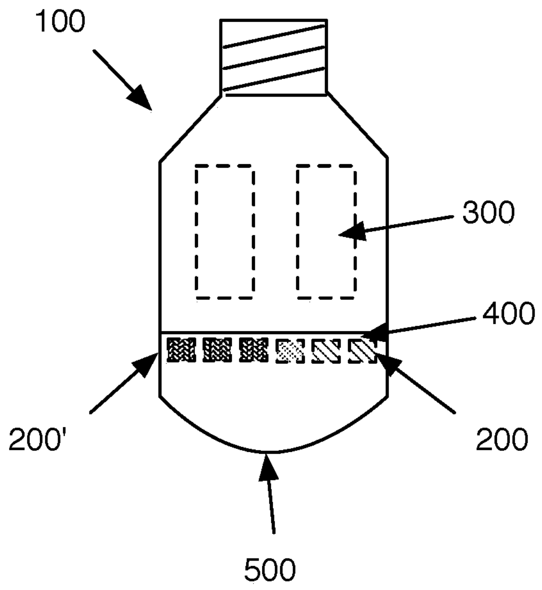
FIGS. 9 and 10 are schematic representations of a second and third configuration of the lighting system, respectively.
Figure 10:
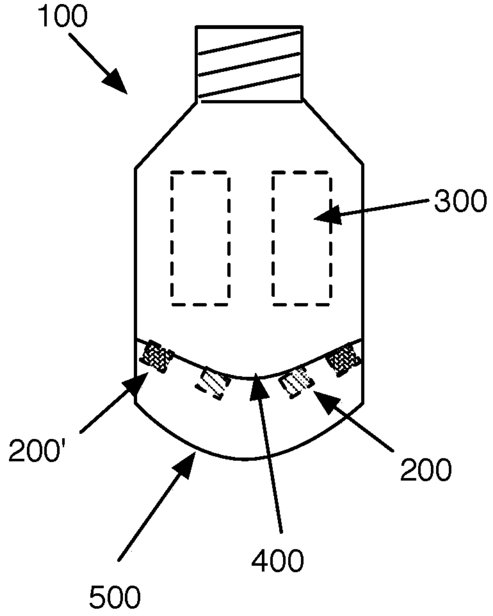

In a first variation, the system includes a first and second set of light emitting elements, wherein both sets are configured to emit visible light. A light parameter (e.g., color temperature, wavelength, etc.) is preferably fixed for both the first and second sets of light emitting elements. The first and second sets of light emitting elements are preferably configured to emit light having a first and second fixed parameter value, respectively. The first and second sets of light emitting elements cooperatively form a lighting system 100 having a dynamically adjustable parameter, wherein the adjustable parameter is preferably the parameter that is fixed for each set of light emitting elements. As shown in FIGS. 9 and 10, in response to receipt of a target value for the fixed parameter from a device, the processor 300 preferably controls the relative pulse rate, intensity, or other operation parameter of the first and second sets of light emitting elements to meet the target value. However, the processor 300 can control the light emitting elements in any other suitable manner. The parameter value of the subsequently emitted light can additionally be verified using a light sensor on the system or the device, or be verified in any other suitable manner.

In a first example of the first variation, the first set of light emitting elements are configured to emit light having a first color temperature, and the second set of light emitting elements are configured to emit light having a second color temperature. The processor 300 preferably controls the relative power provision to the first and second sets of light emitting elements such that the resultant color temperature emitted by the entirety of the lighting system 100 meets a target value, wherein the target value can be received from a device (e.g., a user device, remote server, secondary lighting system 100, etc.).

In a specific example, the first set of light emitting elements are configured to emit white light having a 6,000K color temperature, and the second set of light emitting elements are configured to emit white light having a 2,700K color temperature. In response to receipt of a target color temperature of 4,000K, the processor 300 can control lighting system 100 operation to provide a first pulsing rate to the first set of light emitting elements and a second pulsing rate to the second set of light emitting elements, wherein the first pulsing rate can be 22% of the second pulsing rate. The pulse rates are preferably determined based on a selected total light intensity, which can also be received from the device. Alternatively, the pulse rate can be determined based on a maximum pulse rate or current as determined by a dimmer switch or any other suitable mechanism. However, the pulse rate can be otherwise determined. The processor 300 can additionally accommodate for differences in the number, characteristics (e.g., quality), or any other parameter of light emitting elements between each set. For example, the processor 300 can provide more than 22% of the second current to the first set of light emitting elements when the first set includes less light emitting elements than the second set.

In a second variation, the system includes a first set of light emitting elements configured to emit visible light and a second set of light emitting elements configured to emit light at a wavelength outside of the visible spectrum. The processor 300 preferably controls operation of the first and second sets of light emitting elements independently, in response to independent operation instructions received from the device. More specifically, the processor 300 can supply power to the first set of light emitting elements in response to receipt of a target operation parameter for the first set of light emitting elements, and supply power to the second set of light emitting elements in response to receipt of a target operation parameter for the second set of light emitting elements.

In a specific example, the system can include a first set of light emitting elements configured to emit white light and a second set of light emitting elements configured to emit infrared light. The system can additionally include a third set of light emitting elements configured to emit white light at a second color temperature, wherein the first set of light emitting elements are configured to emit white light at a first color temperature and the processor 300 can selectively control the first and second sets of light emitting elements to achieve a target parameter value. However, the system can include any other suitable sets of light emitting elements.

In response to receipt of a white light operation command, the processor 300 can provide power to the first set of light emitting elements. In response to receipt of an infrared operation command, the processor 300 can provide power to the second set of light emitting elements. Alternatively, the first and/or second sets of light emitting elements can be automatically controlled, based on stored user settings (e.g., stored on-board or remotely), historical use of the set by a user, historical use of the set by a population, or controlled in any other suitable manner.

The infrared light can function to provide better IR coverage for IR applications, such as security applications (e.g., for security camera illumination), monitoring applications (e.g., baby monitoring), night imaging applications, plant growth applications, data transfer applications, or any other suitable application, which can result in higher resolution images. The infrared light is preferably used with a secondary system that includes an infrared sensor, but the system can alternatively include an infrared sensor. In the latter variation, a first lighting system 100 can detect the light emitted by a second lighting system 100.

In one variation of infrared-containing light bulb use, the infrared-containing light bulb is used to provide the infrared light for a security system. The light bulb is preferably distributed about a monitored space, wherein the light bulbs are preferably installed into the light fixtures of the monitored space. The infrared lights are preferably powered in response to shutoff or a decrease in power provision to the set of visible-light emitting elements, but can alternatively be powered on in response to the instantaneous time meeting a predetermined time (e.g., turned on at 6:00 PM), powered on in response to the ambient light falling below a predetermined threshold, or powered in response to any other suitable event.

Figure 23:
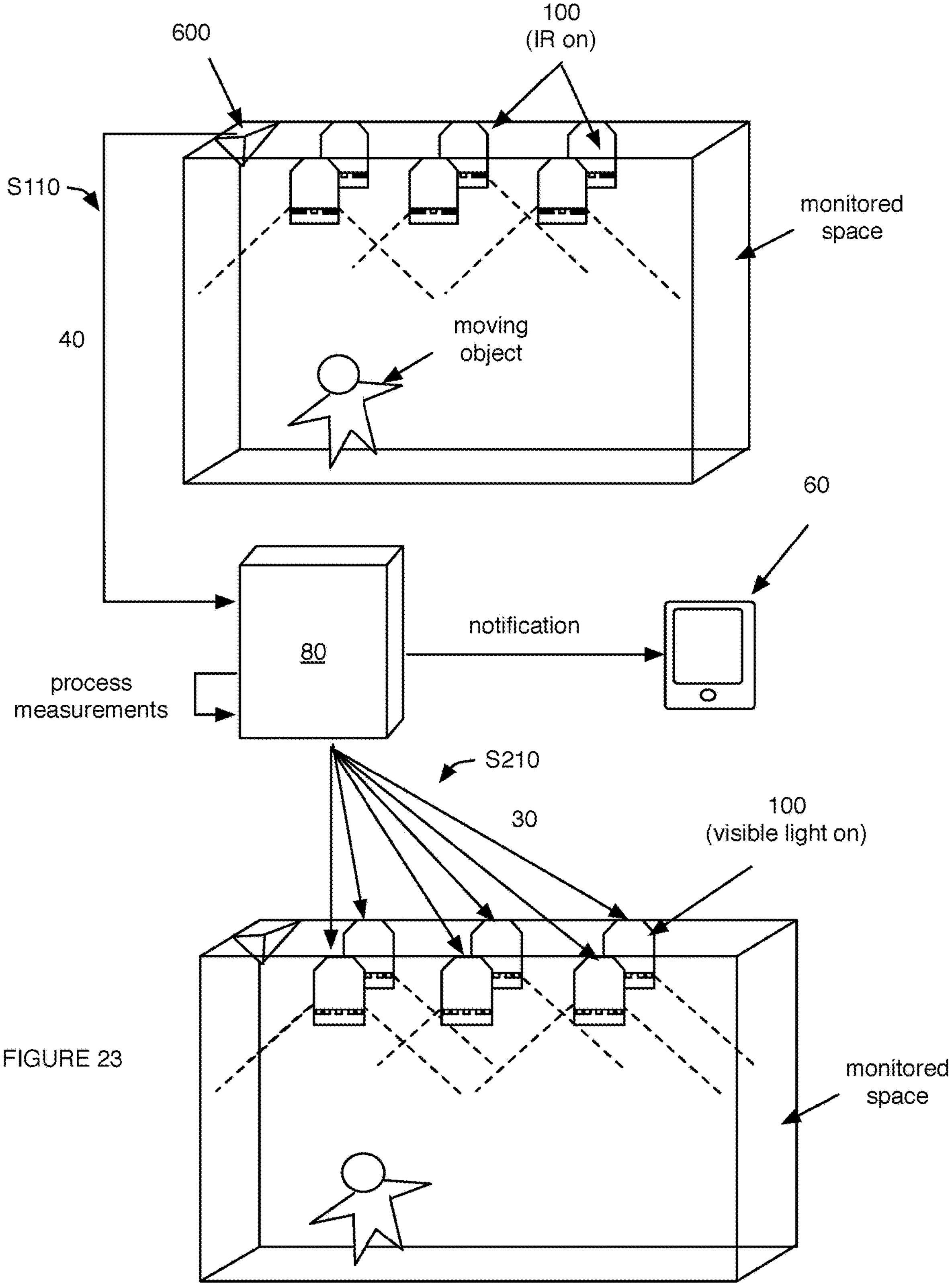
FIG. 23 is a schematic representation of a use case for multiple lighting systems including light emitting elements configured to emit light outside of the visible spectrum, wherein a first set of invisible light emitting elements is operated in a high mode, an external sensor records a measurement of interest (e.g., motion) using the invisible light, and the system automatically controls the visible light emitting elements in response to measurement of interest recordation.

In a specific example, as shown in FIG. 23, a subset of the infrared-containing light bulbs in the monitored space are initially powered. The light bulbs forming the powered subset are preferably substantially evenly distributed about the space, but can alternately be the light bulbs located over a space entry (e.g., window, door, etc.), or be any other suitable subset of light bulbs. Alternatively or additionally, a subset of the infrared elements on each powered light bulb can be powered, while the remaining infrared elements can remain off. Alternatively or additionally, the powered subset can be powered with a low current or pulsed at a low rate, such that the infrared elements provide low-intensity infrared light. The set of powered lighting system 100 s preferably cooperatively illuminate the entire space, but can alternatively illuminate a subset of the space.

In response to motion detection by a sensor, the remaining infrared elements of ah light bulbs in the space can be powered, wherein the current provided to or pulse rate of the infrared elements is preferably high, but can alternatively be low or have any other suitable magnitude. Alternatively or additionally, the first set of visible-light emitting elements can be powered in response to motion detection. An image of the room can additionally be recorded prior to turning the first set of lights on. The image can additionally be processed to determine whether the detected moving object is recognized, wherein the lighting system 100 is preferably operated in a first mode (e.g., a nightlight mode) in response to a recognized object and operated in a second mode (e.g., an full power mode) in response to a non-recognized object. In the nightlight mode, current having a predetermined magnitude or power having a predetermined pulse rate can be supplied to the visible lights of all or a subset of lighting system 100 s. In one example, current can be supplied to the lighting systems 100 proximal the moving object, wherein the location of the moving object can be determined based on the infrared light and sensor measurement analysis.

In another example, the infrared light emitted by the lighting system 100 s can function to create a thermal map of a monitored space, wherein the thermal map can be used to adjust operation of an HVAC system (e.g., air conditioning system). Alternatively, a temperature control system can control the lighting system 100 s to emit infrared light in response to the temperature falling below a temperature threshold.

Figure 24:
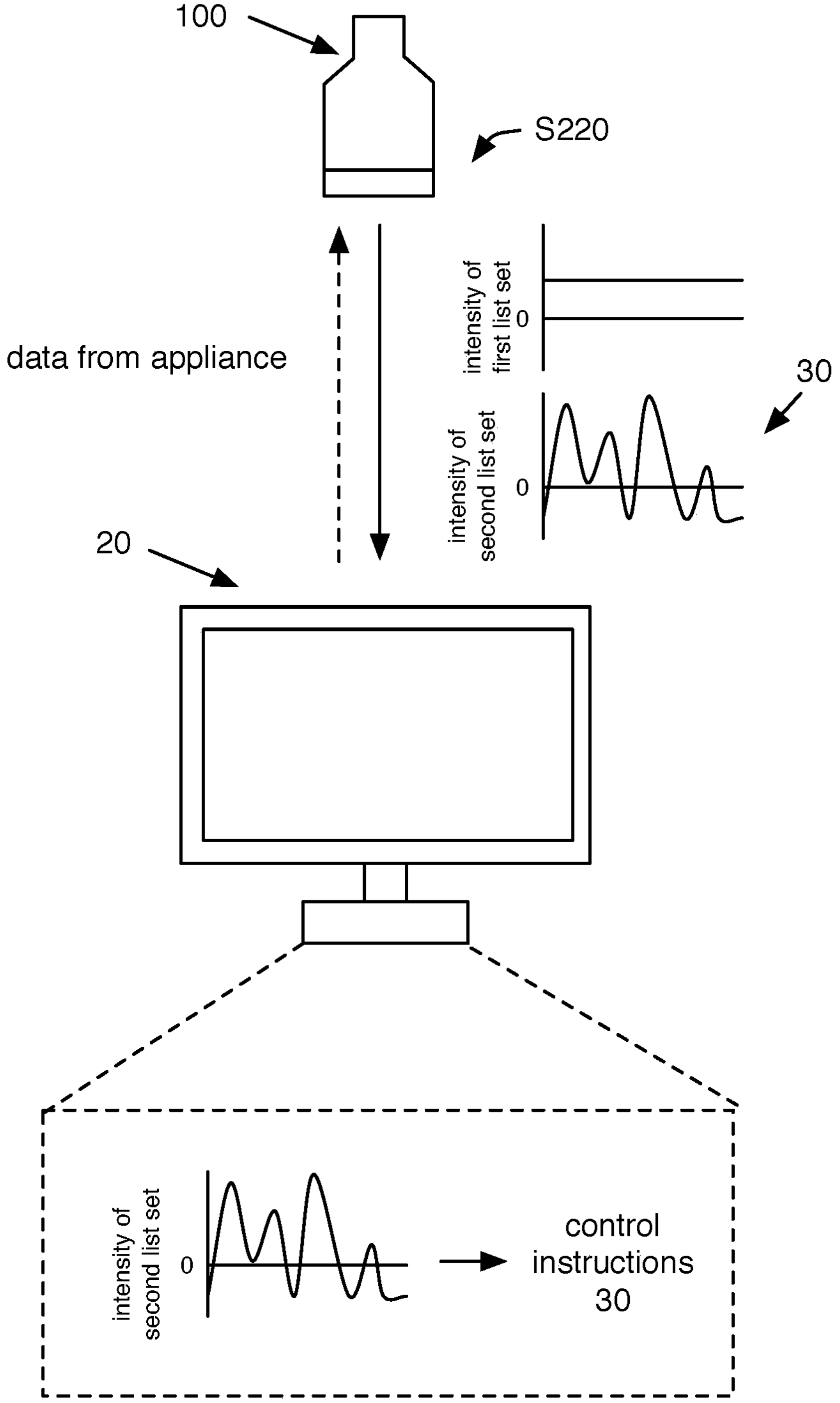
FIG. 24 is a schematic representation of a variation of the method of appliance control using the lighting system.
Figure 25:
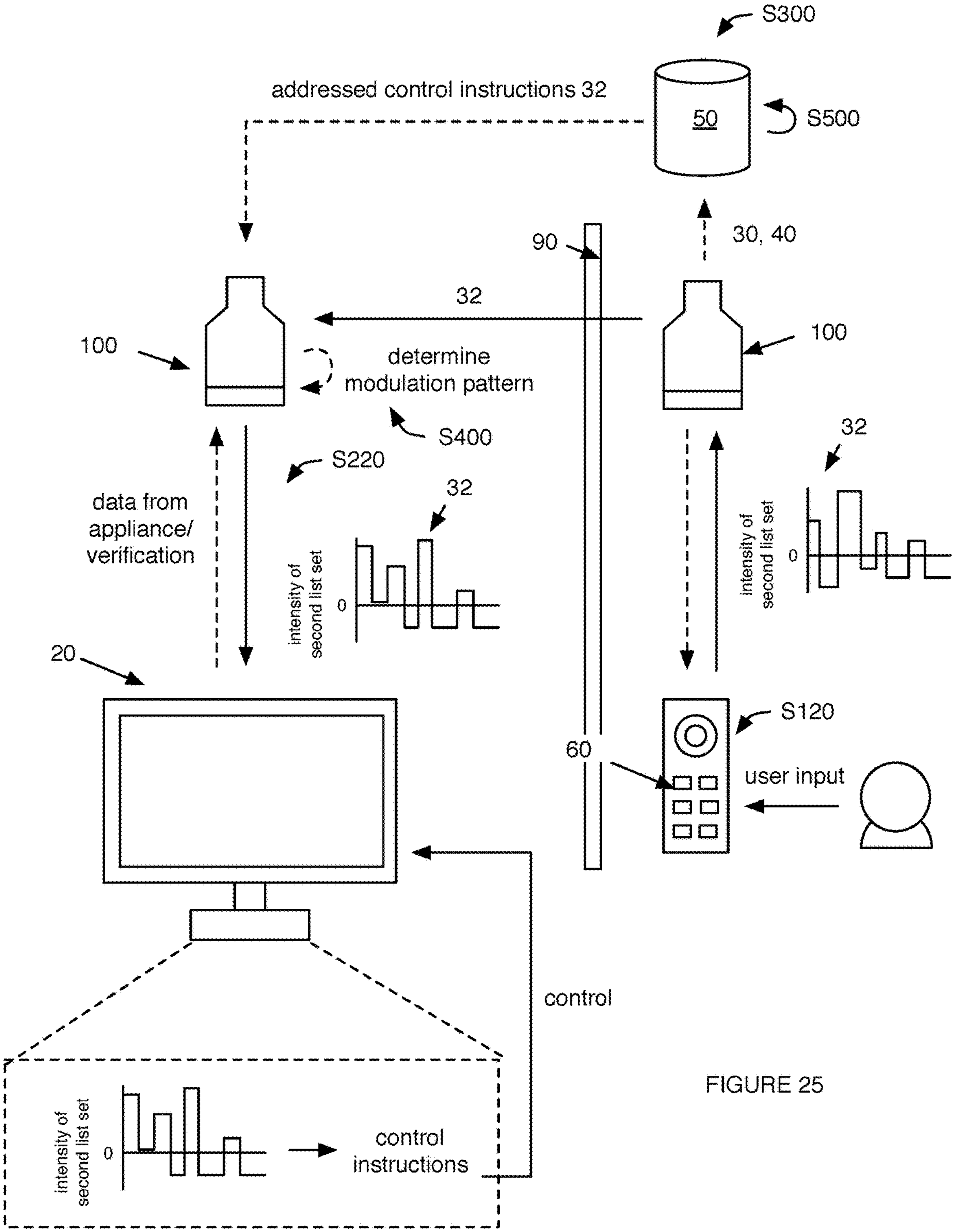
FIG. 25 is a schematic representation of a variation of the method of appliance control extension using the lighting system.

In another example as shown in FIGS. 24 and 25, the infrared light can be used to communicate information from the lighting system 100 to a peripheral device. The peripheral device is preferably within a line of sight of the lighting system 100, independent of visible-light emitting element operation, but can alternatively be arranged in any other suitable location. The information can be communicated by pulsing or otherwise adjusting the intensity, saturation, or any other suitable light parameter of the emitted infrared light. The information can additionally or alternatively be communicated by changing which infrared light emitting element is emitting the infrared light, or communicated in any other suitable manner. The information can be data generated by the lighting system 100, data received by the lighting system 100 from a remote or connected device, or be any other suitable information. The information can be received by a peripheral device, such as a television, mobile phone, or any other suitable device, and converted into a control signal or any other suitable device information for the peripheral device. Examples of control signals that can include operation instructions, media (e.g., audio/video transmission), device identification, device connection information, or any other suitable information. Different infrared light emitting elements of the same lighting system 100 can simultaneously communicate information to two different peripheral devices, but can only communicate information to a single peripheral device, a predetermined set of peripheral devices, or any other suitable number of peripheral devices. The communicated information can be the same piece of information or be different pieces of information, wherein the different pieces of information can be simultaneously communicated by different infrared light emitting elements of the same lighting system 100 or by different lighting systems 100. The lighting system 100 can additionally function to receive data communicated by the peripheral device. The information can be communicated through a data channel (e.g., WiFi), EM signals emitted by the peripheral device (e.g., modulated IR light), or communicated in any other suitable manner.

In a third example, the light emitted by the light emitting elements (e.g., IR, visible light, a combination thereof, etc.) can be used to repel insects, arachnids, or other pests. This example can include determining the location of a user (e.g., using a secondary sensor, the location of a user device associated with the user, etc.) and directing the infrared light or other EM signal to repel pests away from the user location or any other suitable location (e.g., location of food). Directing the infrared light or other EM signal to repel pests away from the user location can include illuminating the area surrounding the user location with IR light, directing EM signals that attract insects at an area distal the user, or otherwise drawing insects away from the user location.

4. Method

Figure 15:
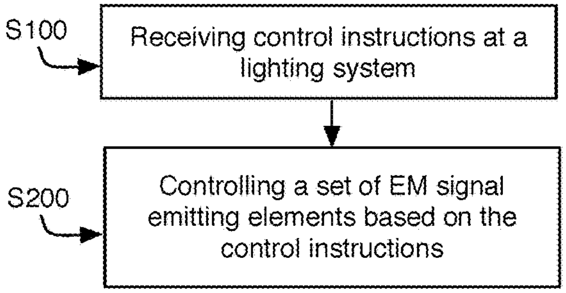
FIG. 15 is a schematic representation of a method of lighting system operation.
Figure 18:
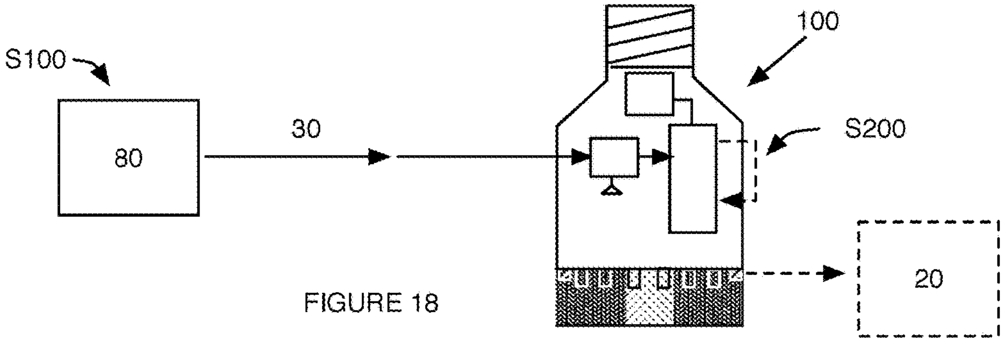
FIG. 18 is a schematic representation of a variation of the method of lighting system operation.

As shown in FIGS. 15 and 18, the method of lighting system operation can include: receiving control instructions at a lighting system S100 and controlling a set of EM signal emitting elements based on the control instructions S200. The method can enable the lighting system to selectively emit light having a range of lighting parameters, even though the lighting system only includes light emitting elements having fixed lighting parameters. The method can additionally enable the lighting system to double as a remote control extender for appliances or other remote-controlled devices. However, the method can function in any other suitable manner.

The method is preferably performed with the system described above, but can alternatively be performed with any other suitable lighting system. More preferably, the method is performed with a plurality of lighting systems and devices (e.g., user devices, remote server systems, sensors, appliances, etc.), wherein the lighting systems and devices are preferably associated with a common user account. However, the method can be performed with any other suitable system.

Receiving the control instruction at the lighting system S100 functions to provide instructions for lighting system operation. The control instruction can be received at the lighting system by the communication module, but can alternatively be received in any other suitable manner by any other suitable component.

Figure 19:
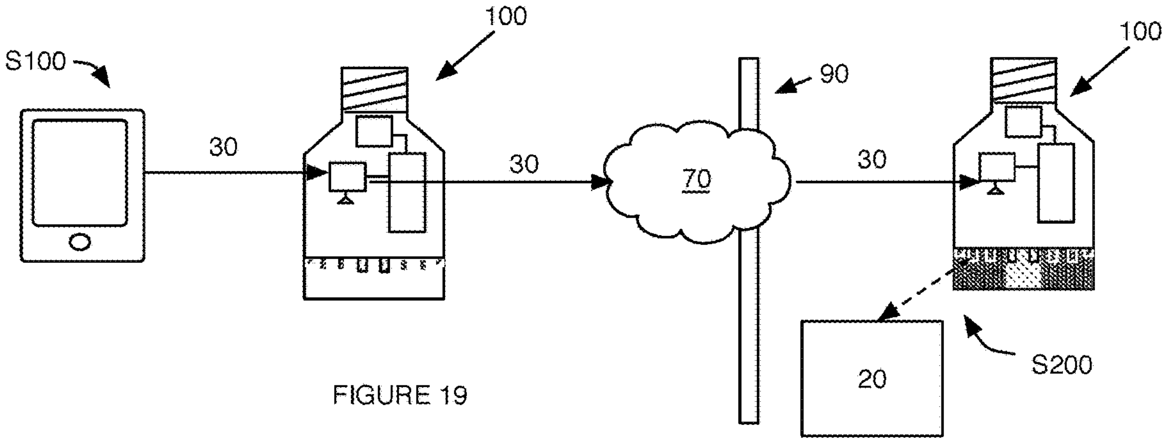
FIG. 19 is a schematic representation of a variation of the method of remote control extension through an EM signal barrier.
Figure 20:
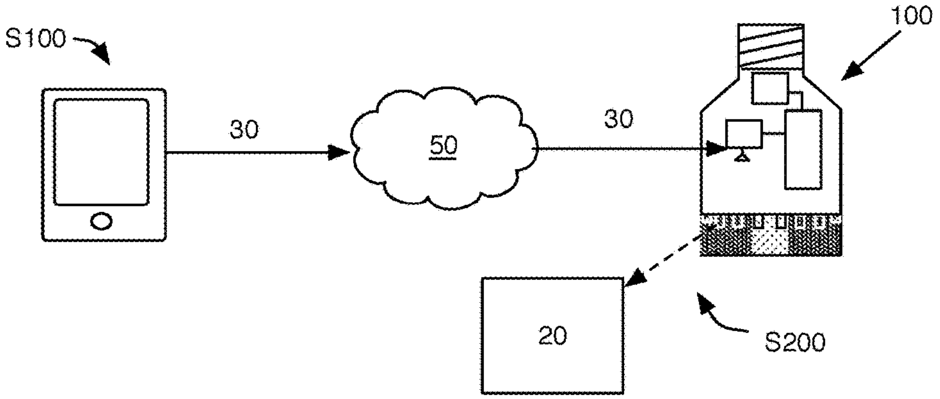
FIG. 20 is a schematic representation of a variation of the method of remote control extension, using an intermediary remote computing system.

The control instruction 30 is preferably received from a sending device, wherein the sending device sends the control instruction or a derivatory instruction to the lighting system, but can alternatively be received from any other suitable source. The instructions can be sent directly, through a secondary lighting system (e.g., as shown in FIG. 19), through a communication network (e.g., WiFi, example shown in FIG. 19), through a remote computing system (e.g., as shown in FIG. 20), or through any other suitable communication channel. The instructions can be sent using the communication protocol in which the control instruction was received, a second communication protocol, or any other suitable protocol. The sending device can be a user device 60 (e.g., wherein the control instruction is entered by a user on a user interface, received by the user device at an input device, etc.), a second lighting system, a remote computing system 50 (e.g., remote server system), an external device (e.g., connected outlet, accessory, computing system, etc.), or any other suitable source. The sending device can receive the control instruction (or a precursor thereof) from a user (and therefore be the receiving device), receive the control instruction from a second sending device, automatically generate the control instruction (e.g., based on instantaneous and historical sensor measurements, etc.), or otherwise determine the control instructions.

The sending device can additionally process the control instruction, such as by compressing the information, associating the control instruction with an endpoint (e.g., appliance identifier, lighting system identifier, EM signal emitting element, etc.), transforming the control instruction (e.g., into the modulation pattern or operation instructions), associating the control information with contextual information (e.g., sensor measurement values recorded within a threshold time period of control instruction receipt, timestamps, etc.), associating the control information with user account information (e.g., a user account identifier), associating the control information with any other suitable information, or otherwise processing the control information.

The sending device is preferably associated with the same user account as the lighting system, but can alternatively be associated with a different user account. The control instruction can be automatically generated, manually entered (e.g., user-generated), or otherwise generated by the sending device.

The control instruction can include one or more lighting instructions 31 (e.g., target EM signal emission parameter values), appliance instructions 32 (e.g., for appliance control), context parameter values 40 (e.g., timestamps, weather information, sensor measurements, etc.), endpoint identifiers (e.g., a unique address for the lighting system, an appliance identifier, etc.), or include any other suitable information. The method can additionally or alternatively determine the type of control instruction. For example, the method can include determining whether the control instruction is an appliance instruction or a lighting instruction, wherein the type of control instruction can be determined based on the length of the control instruction, the communication protocol of the control instruction, an endpoint address included within the control instruction, the commands within the control instruction, or be determined in any other suitable manner. A first set of EM signal emitting elements (e.g., visual light emitting elements) are preferably controlled when the control instructions include lighting instructions (e.g., according to the mixing variant below), and a second set of EM signal emitting elements (e.g., invisible light emitting elements, IR light emitting elements, etc.) are preferably controlled when the control instructions include appliance instructions (e.g., according to the external device control variant below). However, the EM signal emitting elements of one or more lighting systems can be otherwise controlled. The control instructions can include instructions for a single endpoint (e.g., a single appliance, a single lighting system, etc.), instructions for multiple endpoints (e.g., for both lighting systems and appliances, multiple lighting systems, multiple appliances, etc.), or instructions for any suitable set of endpoints.

The control instruction can additionally include trigger events associated with the information, wherein the information is used when the trigger event is met. For example, the control instruction can include a trigger event, including a set of sensor measurement values, associated with the lighting instructions, wherein the lighting instructions are performed when the lighting system sensors record measurements substantially matching the set of sensor measurement values. The control information can additionally include associations between different pieces of the control information. For example, a lighting instruction can be associated with an appliance instruction, wherein the lighting instruction and appliance instruction are to be concurrently performed. However, the control instruction can include any other suitable information.

The method can additionally include determining secondary control instructions based on the control instruction. The secondary control instructions can be for other devices (e.g., lighting systems adjacent the appliance when the control instruction is an appliance instruction; appliance instructions when the control instruction is a lighting instruction, etc.), for the target device, or for any other suitable device. The secondary control instructions can be determined (e.g., generated, selected, calculated, etc.) based on the control instruction and instantaneous contextual parameter values, based on the control instruction alone, or be determined based on any other suitable information. In one example, the control instruction can be an appliance instruction for the thermostat to lower the temperature, while the secondary control instructions can be to concurrently lower the color temperature of visible light emitted by the lighting systems proximal the user (e.g., proximal the user device, such as a smart phone). Alternatively or additionally, when the user historically increases the color temperature of the emitted visible light when the room temperature is lowered, the secondary control instruction can be to concurrently increase the color temperature of the emitted visible light. In a second example, the control instruction can be an appliance instruction for the television to change the channel, wherein the secondary control instructions can be to adjust the color temperature and/or hue of the emitted visible light based on the dominant color palette of the resultant channel. However, the secondary control instruction can be otherwise determined.

Individually controlling a set of EM signal emitting elements based on the control instructions S200 functions to concurrently emit EM signals having one or more properties from the lighting system. Independent EM signal emitting element set operation is preferably controlled by the processor, but can alternatively be controlled by any other suitable control system.

In a first variation, individually controlling the elements includes operating a first set of light emitting elements at a first intensity and operating a second set of light emitting elements at a second intensity, wherein the light emitting elements cooperatively emit visible light having a target light parameter value. In this variation, the first set of light emitting elements includes different light emitting elements from the second set of light emitting elements, and the first intensity is different from the second intensity.

In a second variation, individually controlling the elements includes concurrently operating a set of visible light emitting elements according to a lighting instruction, and operating a set of communication EM signal emitting elements (communication elements) according to an appliance instruction. The set of visible light emitting elements can be operated according to a lighting instruction as discussed in the first variation. The set of communication elements can be operated according to the appliance instruction by determining a modulation pattern corresponding to the appliance instruction (e.g., that will communicate the appliance instruction to the appliance), and modulating the waveform of the power supplied to the communication elements according to the modulation pattern. Operating the set of communication elements can additionally or alternatively include selecting the communication element most proximal the appliance, and controlling only the selected communication element according to the modulation pattern. However, the element sets can be otherwise individually controlled.

The method can additionally include learning control instructions based on contextual patterns S500, which functions to automatically determine and control the appliances and lighting systems according to user preferences. The user preferences can be individual user preferences, global user preferences, or user preferences for any other suitable set of users. The user preferences can be stored in association with the user account, stored by the user device, stored by the lighting systems, or be stored in any other suitable manner. The control instructions and associated contextual patterns are preferably learned by the remote computing system, but can alternatively be learned by the user device, one or more lighting systems, or by any other suitable computing system. The control instructions are preferably learned from historical control instructions and their associated contextual parameter values, but can alternatively be received from a user, or otherwise determined.

In one variation, learning control instructions based on contextual patterns includes: receiving the control instruction; determining context parameter values associated with control instruction receipt; assigning the context parameter values with the control instructions to form a control record; and extracting a context parameter value pattern associated with the control instruction from a plurality of control records. The lighting system is preferably automatically controlled according to the control instruction in response to the occurrence of an instantaneous set of context parameter values substantially matching the context parameter value pattern. However, the control instructions and associated contextual pattern can be otherwise determined.

The context parameter values are preferably values measured within a predetermined time threshold of control instruction receipt (e.g., concurrent with control instruction receipt, within 10 seconds of receipt, etc.), but can alternatively be recorded at any other suitable time. The context parameter values can be a timestamp; a weather variable value (e.g., received from a remote server system); an appliance operation state; a lighting system operation state; a lighting plurality operation state; a sensor measurement value (e.g., ambient noise, temperature, light, etc.) from one or more lighting systems, connected outlets, connected switches, or other connected systems; a pattern or combination of device operation states; or be a value of any other suitable parameter indicative of context.

Automatic system control based on satisfaction of the contextual parameters can include: automatically generating and/or communicating appliance instructions to the appliances via the lighting systems; automatically generating and/or communicating lighting instructions to the lighting systems; or automatically controlling any other suitable device. The control instructions can be generated and/or communicated by a control system, wherein the control system can be the remote computing system (e.g., server system), a user device, a lighting system or set thereof, or by any other suitable set of computing systems. The control system can receive sensor measurements, control instructions, or any other suitable information from the connected devices (e.g., lighting systems, user devices, connected outlets, etc.) at a predetermined frequency, as the measurements are recorded, or at any other suitable time.

Figure 29:
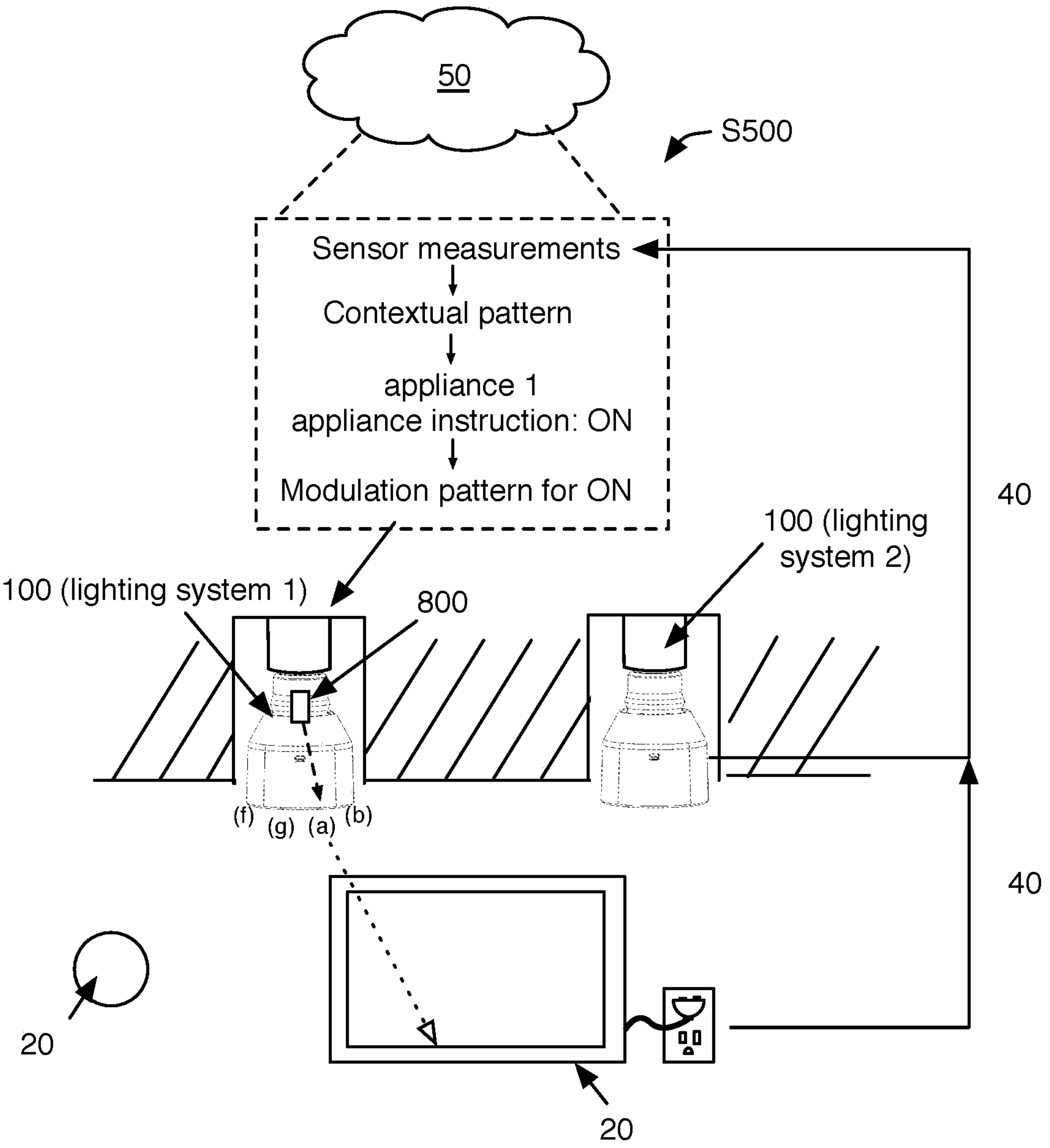
FIG. 29 is a schematic representation of lighting system control based on context.

In one example, the method can include operating a first set of appliances according to a first set of control instructions in response to a first contextual pattern being met (example shown in FIG. 29), and operating a second set of appliances according to a second set of control instructions in response to a second contextual pattern being met. The first and second set of appliances can be the same or different. The first and second set of control instructions can be the same or different.

In a specific example, the method can include: automatically turning on a first set of appliances when a user enters the house, and automatically shutting off a second set of appliances when a user leaves the house or goes to sleep. In this specific example, the first contextual pattern can be the user entering the house (e.g., determined based on the geographic location of the user device, proximity to beacons, based on power provision to one or more lighting systems within the house); and the second contextual pattern can be the user turning off the light (e.g., power provision cessation).

In response to determination of user entry, the method can include: concurrently communicating a first set of control instructions associated with the first context parameter pattern to a plurality of appliances through a plurality of lighting systems (e.g., to turn on all the appliances that the user usually turns on). The method can additionally include storing power in power storage devices on-board each of the plurality of lighting systems in response to power receipt at the lighting system.

In response to cessation of power provision to the lighting system, the method can include concurrently communicating a second set of control instructions to the plurality of appliances through the plurality of lighting systems (e.g., to turn off all the appliances that the user usually turns off). Because no more power is being supplied to the lighting systems at this time, each lighting system can use the power stored by the respective power storage devices (e.g., batteries) to: determine that power provision has ceased; send a power cessation notification to the control system; receive control instructions from the control system, and send the control instructions to the respective appliances. However, the system can be otherwise controlled based on contextual patterns.

4.1 Mixing

Figure 16:
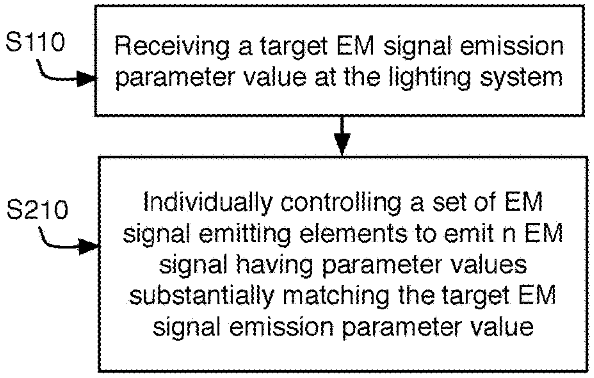
FIG. 16 is a schematic representation of a method of mixing EM signals emitted by the lighting system to achieve a target EM signal emission parameter value.

In a first variation as shown in FIG. 16, this method includes: receiving a target EM signal emission parameter value at the lighting system S110 and individually controlling different sets of EM signal emitting elements to emit an EM signal having parameter values substantially matching the target EM signal emission parameter value S210. In this variation, receiving the control instruction includes: receiving a target EM signal emission parameter value at the lighting system; and individually controlling a set of EM signal emitting elements based on the control instructions includes: individually controlling different sets of EM signal emitting elements to emit an EM signal having parameter values substantially matching the target EM signal emission parameter value. This method variant functions to provide a lighting system, made from lighting elements having static lighting properties, with dynamically adjustable lighting capabilities.

In one example, the method includes: receiving a target light parameter value (e.g., color temperature value), determining the relative intensities for a first and second light emitting element set to meet the target light parameter value, and operating the first and second light emitting element sets at the respective intensities to cooperatively emit light having substantially the target light parameter value.

Figure 21:
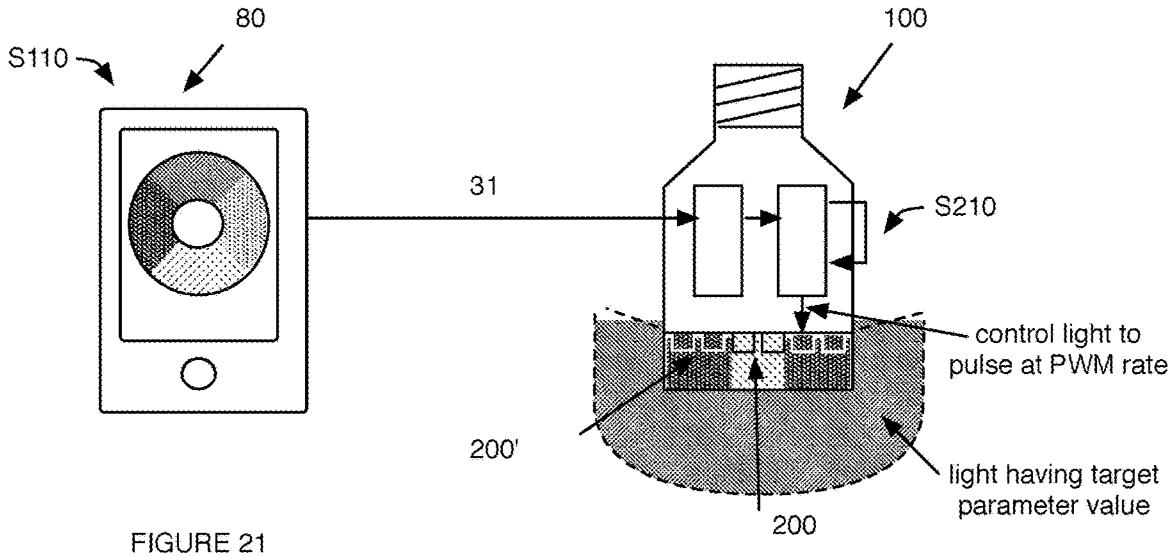
FIG. 21 is a schematic representation of a specific example of controlling the lighting system according to a lighting instruction.
Figure 22:
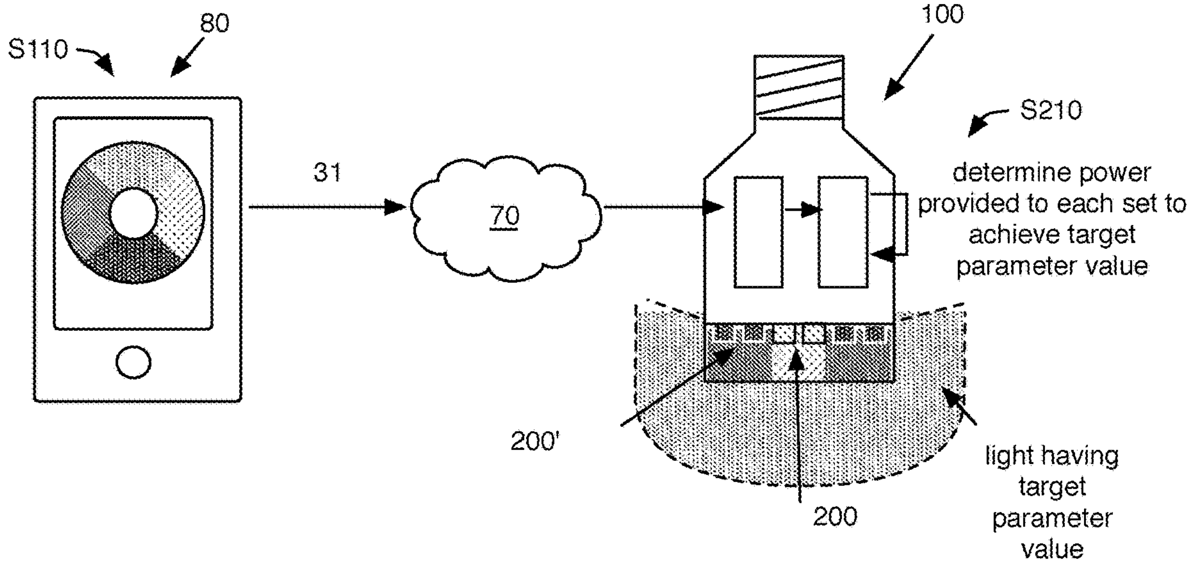
FIG. 22 is a schematic representation of a specific example of controlling the lighting system according to a lighting instruction, through a remote or local communication network.

In a first specific example, as shown in FIGS. 21 and 22, the lighting system has a first plurality of light emitting elements and a second plurality of light emitting elements. The first plurality of light emitting elements emits white light having a fixed, cool color temperature (e.g., without the capability to emit light having another color temperature). The second plurality of light emitting elements emits white light having a fixed, warm color temperature. The target color temperature is between the cool and warm color temperatures. The method determines how bright the first plurality of light emitting elements should be operated, and how bright the second plurality of light emitting elements should be operated, such that the light emitted by the lighting system (i.e., the light cooperatively emitted by the first and second pluralities of light emitting elements and blended by the diffuser) has a color temperature substantially matching the target color temperature.

In a second specific example, the first plurality of light emitting elements emits light having a first fixed hue (e.g., red) and the second plurality of light emitting elements light having a second fixed hue (e.g., red), each plurality without capability to emit light having another hue. In response to receipt of a control instructions specifying a target hue of purple, the first and second plurality of light emitting elements can be controlled to both emit the same intensity of light. The intensity of each plurality can substantially match that specified by the control instructions, be half that specified by the control instructions, or be any other suitable intensity. In response to receipt of a control instructions specifying a target hue of red, the first plurality of light emitting elements can be operated at the specified intensity, while the second plurality of light emitting elements can be operated at a low intensity or shut off. However, the first and second pluralities can be otherwise operated to achieve a target parameter value.

Receiving a target EM signal emission parameter value at the lighting system S110 functions to provide the lighting system with control instructions for EM signal emitting element operation. The target EM signal emission parameter value (target parameter value) is preferably received as part of a set of control instructions (as discussed above), but can alternatively be otherwise received. The EM signal emission parameter value can be a specific wavelength (e.g., hue, color temperature, saturation, etc.), intensity, direction, phase, or be any other suitable parameter value.

Individually controlling different sets of EM signal emitting elements S210 functions to control the lighting system to emit an EM signal having parameter values that substantially match the target EM signal emission parameter value. Individually controlling different sets of EM signal emitting elements can include: determining the relative operation parameters for multiple sets of EM signal emitting elements, based on the target parameter value and the respective emission properties of the sets; and controlling each set according to the respective operation parameter.

The operation parameters that can be determined include the operation intensity (e.g., the amplitude or emission intensity for each set), the percentage of each set to be operated (e.g., in variants wherein individual subsets can be independently controlled), or include any other suitable operation parameter. The operation parameters can calculated, empirically determined (e.g., by dynamically adjusting the relative operation parameters and measuring the emitted light with an external sensor), selected from a graph or chart, or otherwise determined.

Determining the relative operation parameters can include calculating an operation parameter ratio for the multiple sets, based on the respective fixed operation parameter for each set and the target operation parameter value. For example, if the first and second sets have a 1,700K and 10,500K color temperature, respectively, and the target color temperature is 5,00K, then the operation ratio for the first set can be 62.5% more than the second set. The first set can be operated at an intensity that is 62.5% higher than the intensity of the second set, have 62.5% more elements in operation compared to the second set, or be controlled based on the calculated ratio in any other suitable manner.

Determining the relative operation parameters can additionally include accounting for a second target operation parameter value. For example, the control instruction can specify both a target color parameter (e.g., color temperature, hue, saturation) and a target intensity for the cooperatively emitted light, wherein the method can scale the respective intensities of each light emitting element set based on the target intensity (e.g., to substantially meet the target intensity). The second target operation parameter value can be accounted for by scaling the determined intensities, applying the determined ratio to the second target operation parameter value, using the second target operation parameter value as the maximum value for any light emitting element set, or be otherwise accounted for.

Determining the relative operation parameters can additionally include accommodating for differences in perceived intensities of the first and second sets. For example, when a first light having a warm color temperature (e.g., 1,700K) and a second light having a cold color temperature (e.g., 10,5000K) are emitted at the same intensity, the first light can be perceived as less intense by a user, wherein the method can accommodate for this discrepancy by increasing the intensity of the first light. Accommodating for the differences can include weighting the respective fixed operation parameter value for the set when determining the ratio, correcting the ratio by a correction factor, or otherwise accommodating for the difference in perception. However, the relative operation parameters can be otherwise determined.

Controlling each set according to the respective operation parameter preferably includes determining a pulse width modulation pattern (PWM pattern) corresponding to the relative operation parameter for the set and providing power to the light emitting element according to the PWM pattern (e.g., as described above). However, each set can be otherwise controlled based on the operation parameter.

4.2 External Device Control

Figure 17:
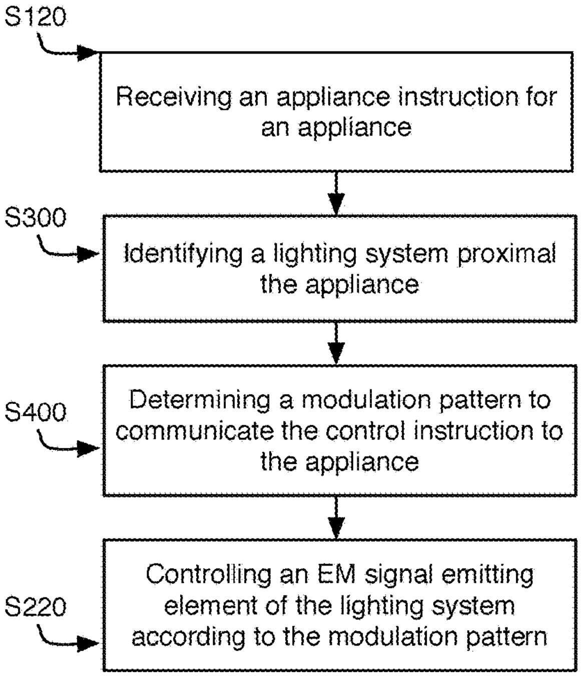
FIG. 17 is a schematic representation of a method of using the lighting system to extend the range of device remote control.

In a second variation as shown in FIG. 17, the method includes: receiving an appliance instruction for an appliance S120, identifying a lighting system proximal the appliance S300, determining a modulation pattern to communicate the control instruction to the appliance S400, and controlling an EM signal emitting element of the lighting system according to the modulation pattern S220. In this variation, receiving the control instruction at the lighting system includes: receiving the appliance instruction or derivatory instructions, and individually controlling a set of EM signal emitting elements based on the control instructions includes: controlling an EM signal emitting element of the lighting system according to the modulation pattern.

This method functions to extend the communication range of a remote control. The method can additionally function to target communication to the appliance, such that other appliances adjacent the target appliance (e.g., within the same room as the target appliance) do not receive the control instruction and/or are not controlled by the control instruction. This can be useful when multiple appliances of similar type are closely arranged (e.g., when multiple televisions are closely arranged), but only one appliance is to be controlled. The method can additionally function to simultaneously send communications to multiple appliances, whether adjacent (e.g., in the same room) or remote (e.g., in different rooms, buildings, or other geographic locations). The method can additionally function to translate control instructions between communication protocols, which can expand the number of remote control devices that can be used to control the appliance.

The second method variation or any portion thereof can be performed in conjunction with, concurrently with, or independently from first method variation performance. However, the system can be used in any suitable manner and/or perform any other suitable functionality.

Receiving an appliance instruction S120 functions to provide the appliance instruction to the system for subsequent processing and/or transmission. The appliance instruction can be received by a user device, the lighting system, a secondary lighting system, a remote computing system, or by any other suitable system. The receiving system is preferably associated with the same user identifier (e.g., user account, WiFi network, IP address, etc.) that the lighting system (and/or appliance) is associated with, but can alternatively be unassociated with any user identifier, associated with a different user identifier, or otherwise related to the lighting system. The appliance instruction can be received from a sending device 80 (e.g., in the manner discussed above), received from the user (e.g., at a user input device, at a graphical interface, etc.), but can alternatively be received from any other suitable source.

The appliance instruction is preferably a set of instructions meant for an appliance, and can include control instructions (e.g., on/off instructions, setting selection, setting control, etc.), display information (e.g., A/V information), or include any other suitable information. An appliance is preferably a home appliance (e.g., device designed for domestic or household functions, such as televisions, washing machines, stoves, ovens, etc.), but can alternatively be any remote-controlled device (e.g., toys, robots, etc.), device having a wireless communication module (e.g., secondary lighting systems, connected outlets, switches, user device, etc.), or be any other suitable device.

In one variation, the method can additionally include sending data indicative of the appliance instruction to the lighting system. The data indicative of the appliance instruction can be the appliance instruction, as received by the receiving device; be a derivatory instruction, determined (e.g., computed, translated, selected, etc.) based on the appliance instruction (e.g., the modulation pattern); or be any other suitable data associated with the appliance instruction. The data indicative of the appliance instruction is preferably sent by the device receiving the appliance instruction (receiving device) via a wireless communication method, but can alternatively be sent by any other suitable computing system in any other suitable manner.

The receiving device is preferably external the lighting system, but can be arranged in any other suitable position. The receiving device can be proximal the lighting system (e.g., within communication range for a short-range communication protocol, within communication range for a lighting system-hosted local network, within the same room as the lighting system, within a predetermined distance of the lighting system, etc.), remote from the lighting system (e.g., outside of the communication range for a short-range communication protocol, located in a different room or building from the lighting system, outside a predetermined distance of the lighting system, etc.), or be arranged in any suitable physical position relative to the lighting system.

The data indicative of the appliance instruction can be sent before the modulation pattern is determined (e.g., wherein the lighting system determines the modulation pattern), after the modulation pattern is determined (e.g., wherein the data is the modulation pattern or a precursor thereof), or at any other suitable time. The data indicative of the appliance instruction is preferably sent after the lighting system proximal the appliance is identified, but can alternatively be sent at any other suitable time.

In a first example, receiving the appliance instructions can include: receiving the appliance instructions at a device from a user; and sending the appliance instructions to a first lighting system from the device in response to appliance instruction receipt. The method can additionally include forwarding the appliance instructions (or derivatory instructions) to a second lighting system, remote server system, or any other suitable endpoint. In a second example, receiving the appliance instructions can include: receiving the appliance instructions at a device from a user; sending the appliance instructions to a remote server system from the device in response to appliance instruction receipt; and sending the appliance instructions (or derivatory instructions) to the lighting system from the remote server system. In a third example, receiving the appliance instructions can include: generating the appliance instructions at a remote server system, user device, or lighting system; and sending the appliance instructions (or derivatory instructions) to the lighting system. However, the appliance instructions can be otherwise received and/or generated.

Figure 26:
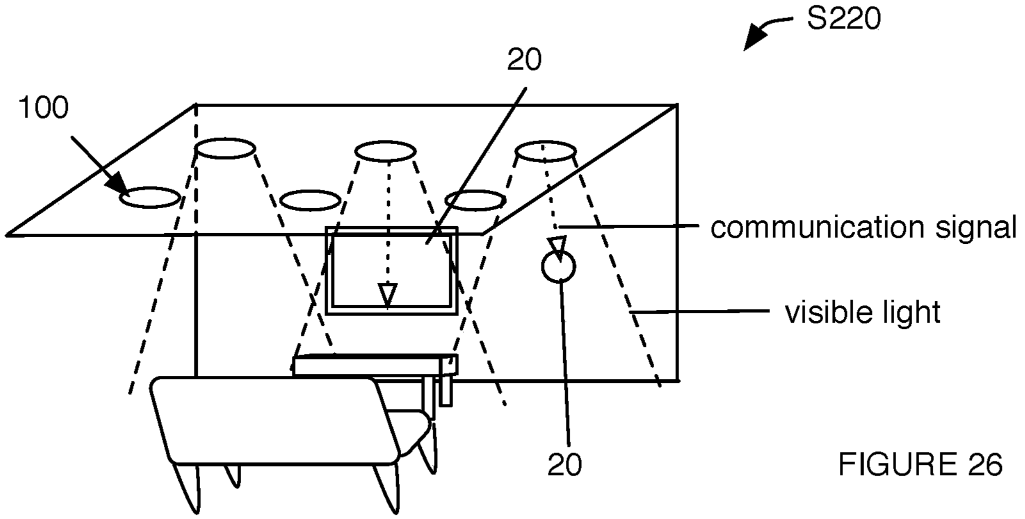
FIG. 26 is a schematic representation of a variation of the method, including concurrently displaying visible light based on a lighting instruction and emitting control signals based on an appliance instruction.

Identifying a lighting system proximal the appliance S300 functions to identify the lighting system with the highest probability of communicating the appliance instruction to the appliance, such that the appliance instruction or derivatory instruction can be sent only to the identified lighting systems (example shown in FIG. 26). This can function to reduce data traffic and reduce unintentional appliance control.

In a first variation, the lighting system(s) proximal the appliance (e.g., local the appliance) can be uniquely identified, wherein the control instruction (or derivatory information) can be addressed to the lighting system and sent to the lighting system. The addressed lighting system can be sent through a common communication channel shared by all connected devices (e.g., associated with the user account), wherein the lighting system identified by the address selectively receives the information (e.g., pulls the information), and the other lighting systems ignore the information. Alternatively or additionally, the control instructions can be sent only to the targeted lighting system by selectively connecting to a local network hosted by the lighting system based on the address, and communicating the control instruction through the local network. Alternatively or additionally, the information can be sent peer to peer (e.g., verified through a digital handshake). Alternatively or additionally, the information can be sent in a targeted direction (e.g., broadcast in a physical direction, such as in the direction of a room in which the lighting system is located). However, the information can be otherwise targeted at the lighting system.

In a second variation, the lighting system can remain unidentified, and the appliance instructions can be broadcast to all lighting systems associated with the user account, ah lighting systems within a predetermined physical range, all lighting systems connected to a common wireless network, or to any other suitable set of lighting systems.

The lighting system can be identified by the receiving device, by an intermediary device (e.g., a remote server system), or by any other suitable device. The lighting system is preferably identified by a lighting system identifier, but can alternatively be otherwise identified. The lighting system identifier can be globally unique, unique within the population of lighting systems associated with the user account, unique within the population of lighting systems within a geographic area or connected to a common wireless network, generic/shared, or be otherwise related to other lighting system identifiers. The lighting system identifier can be automatically determined (e.g., assigned by the manufacturer, automatically assigned upon user setup based on other lighting systems already associated with the user account or the communication network 70, etc.), manually determined (e.g., assigned by a user), or be otherwise determined.

The identified lighting system is preferably associated with the appliance identifier, but can alternatively be any other suitable lighting system. In one variation, the method includes identifying the appliance identifier based on the control instructions, and identifying the lighting system based on the appliance identifier. The appliance identifier can be definitively determined or probabilistically determined (e.g., wherein the target appliance is the one that has the highest probability of being the target, based on context, etc.). The appliance identifier is preferably associated with the user account, but can alternatively be unassociated with the user account. The appliance identifier can be determined based on control instruction parameters (e.g., control instruction length, communication protocol, etc.); based on the content of the control instructions, wherein the instructions are compared against a database of instructions; based on an endpoint identifier included in the control instructions; or otherwise determined. In one example, a television identifier is identified in response to the control instructions being below a predetermined size or length, while an air conditioning unit identifier is identified in response to the control instructions being above a second size or length. However, the target appliance identifier can be otherwise determined.

Figure 28:
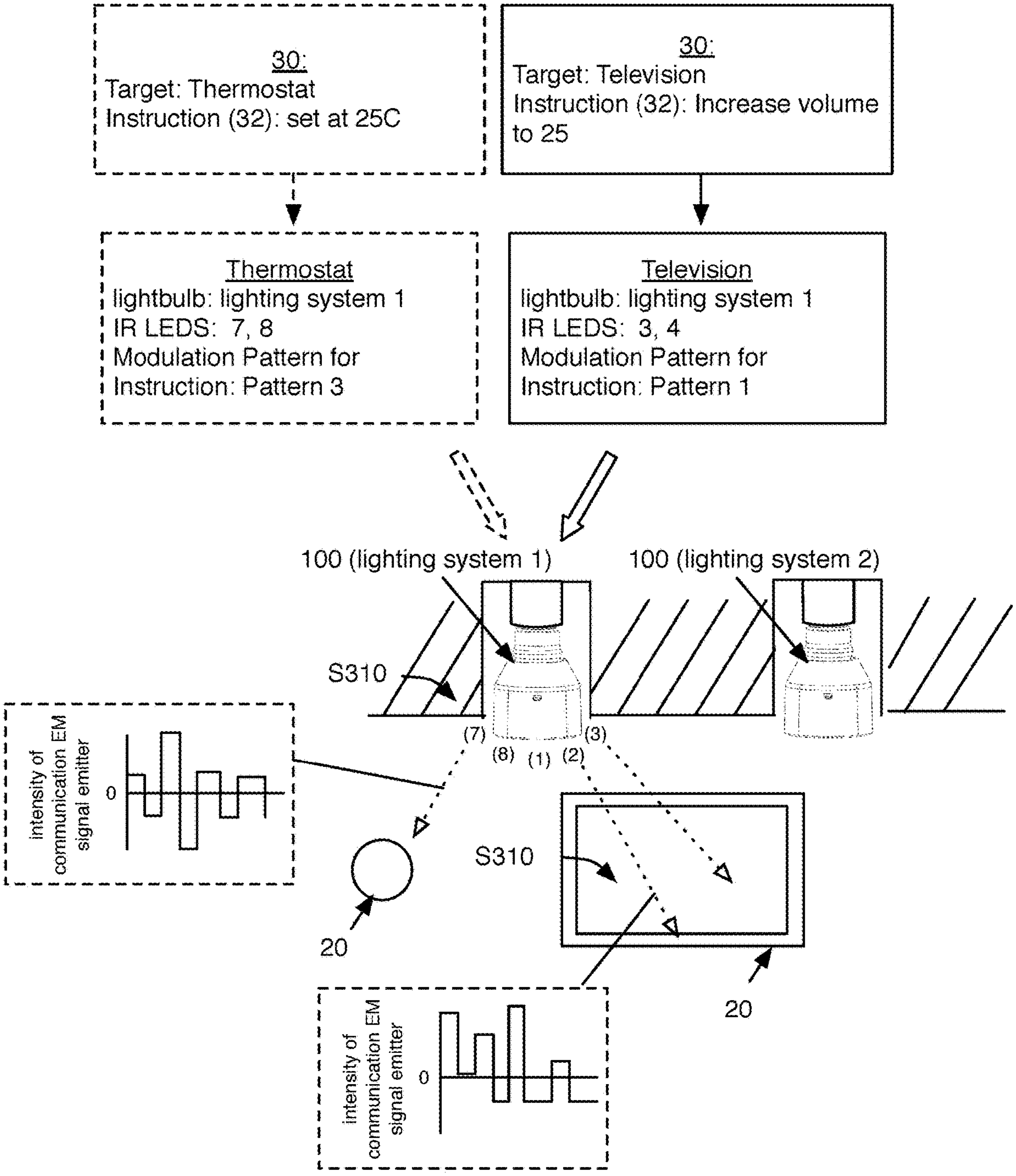
FIG. 28 is a schematic representation of a variation of lighting system control based on a set of application instructions.

In a first variation, identifying the lighting system proximal the appliance can include: retrieving a lighting system identifier associated with the appliance from a database (example shown in FIG. 28). In a second variation, identifying the lighting system proximal the appliance can additionally or alternatively include: sequentially sending and controlling the lighting system to emit the appliance instruction (or derivatory instruction) to different lighting systems associated with the user account until the appliance receives the appliance instruction, which can be determined based on a detected change in appliance operation (e.g., wherein a lighting system sensor or other sensor on another system, such as an outlet or light switch, records a measurement indicative of the change). However, the lighting system proximal the appliance can be otherwise identified.

The method can additionally include associating the lighting system with the appliance, which can be subsequently used in the first variation of identifying the lighting system proximal the appliance. Associating the lighting system with the appliance can include: determining an association between the lighting system and the appliance, and storing the lighting system identifier in association with the appliance. The lighting system(s) within communication range of the appliance (e.g., local lighting systems, proximal lighting systems, etc.) are preferably associated with the appliance, but any other suitable lighting system can be associated with the appliance.

Storing the lighting system identifier in association with the appliance can include: storing the identifier for the lighting system (lighting system identifier) in association with the identifier for the appliance (appliance identifier) in a remote computing system or other storage system; storing the appliance identifier in the lighting system memory; or otherwise associating the lighting system with the appliance. One or more lighting systems can be associated with each appliance, and one or more appliances can be associated with each lighting system.

The association between the lighting system and the appliance can be determined: manually (e.g., received from a user, wherein the user enters or selects the lighting system identifier and the appliance identifier); pseudo-automatically; automatically; or otherwise determined. In one variation of pseudo-automatic association determination, the user device is placed or held next to the appliance (e.g., in front of, adjacent the appliance sensor, between the appliance and the lighting system, etc.). Individual lighting systems are then independently operated at different times (e.g., controlled by a user device, remote computing system, etc.). The user device (or user) notifies the system when light (visible or invisible) emitted by the lighting system is proximal or illuminates the appliance and/or the light sensor of the user device. The identifiers of the lighting system(s) in operation when the appliance and/or user device light sensor was illuminated are then associated with the appliance. However, the association can be otherwise pseudo-automatically determined.

In one variation of automatic association determination, the system can determine the relative position between a lighting system and an outlet, wherein the outlet is electrically connected to the appliance and identifies or is otherwise associated with the appliance. The position of the lighting system relative to the outlet can be automatically determined (e.g., based on trilateration using signals emitted and detected by the lighting system and/or outlet, determined from an image of the room, etc.), received from a user, or otherwise determined. The appliance connected to the outlet can be: manually identified; automatically identified based on data transfer from the appliance to the outlet; automatically identified based on the amount of power drawn, pattern of drawn power; or otherwise identified. The appliance can be assumed to have a rear face facing the outlet, with the sensing face distal the outlet, but can be assumed to be in any other suitable position. The lighting system having light emitting elements directed toward the outlet is preferably associated with the appliance, but any other suitable lighting system can be associated with the appliance. However, the lighting system can be otherwise associated with the outlet.

Associating the lighting system with the appliance can additionally or alternatively include associating one or more specific EM signal emitting element(s) of the lighting system with the appliance, wherein the EM signal emitting element identifier(s) are preferably subsequently identified and elements operated to communicate the control instruction to the appliance S310. In this variation, the EM signal emitting elements of the lighting system can be individually indexed (e.g., as shown in FIG. 12) and controlled. In operation, when a control instruction is to be communicated to the appliance, the specific EM signal emitting element communicates the control instruction to the appliance, while the other EM signal emitting elements of the lighting system can operate in a different mode (e.g., in a dim, off, or standby mode) (example shown in FIG. 28). This functions to target communication to the target appliance, which can limit inadvertent control instruction communication to other appliances. This also functions to allow a single lighting system to concurrently control (or communicate control instructions to) multiple appliances.

Figure 27:
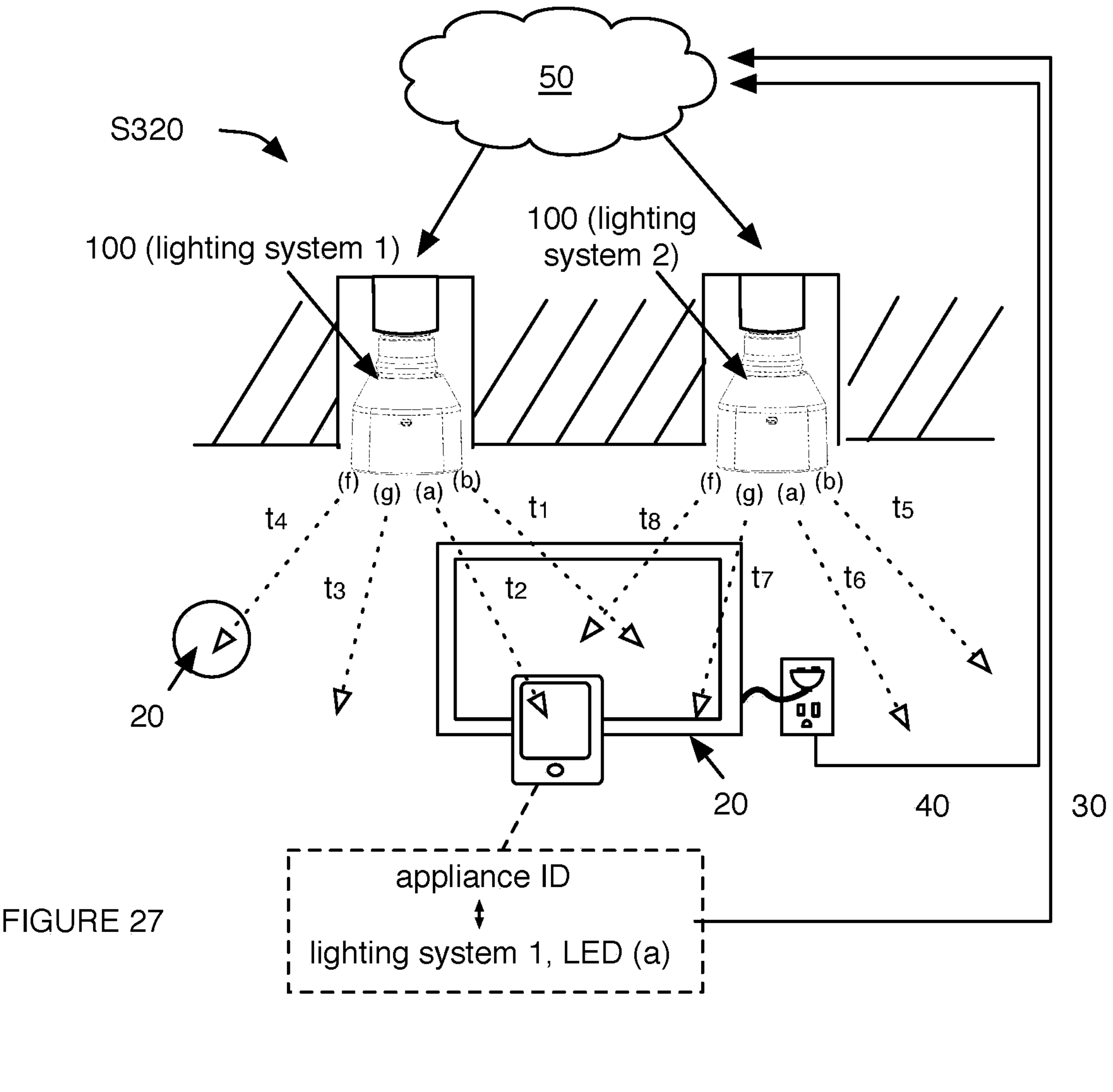
FIG. 27 is a schematic representation of associating the lighting system with the appliance.

As above, associating one or more EM signal emitting elements with the appliance S320 can include: determining an association between the EM signal emitting element(s) with the appliance and storing identifier(s) for the EM signal emitting element(s) with the appliance identifier (example shown in FIG. 27). However, the EM signal emitting elements can be otherwise associated with the appliance. The association can be stored in a similar manner to lighting system association storage, or be stored differently. The association can be stored by the lighting system, by a second lighting system, by a remote server, by a user device, or by any other suitable system.

The EM signal emitting element associated with the appliance is preferably a communication signal emitting element (e.g., an invisible signal emitting element, such as an IR light emitting element, RF emitting element, visible light emitting element, etc.), but can alternatively be a visible light emitting element or be any other suitable EM signal emitting element. The EM signal emitting element(s) within communication range of the appliance (e.g., local lighting systems, proximal lighting systems, etc.) are preferably associated with the appliance, but any other suitable EM signal emitting element can be associated with the appliance.

The association between the EM signal emitting element and the appliance can be determined: manually (e.g., received from a user, wherein the user enters or selects the EM signal emitting element identifier and the appliance identifier); pseudo-automatically; automatically; or otherwise determined. However, the EM signal emitting element can be dynamically associated with the appliance (e.g., the control instruction is communicated by different EM signal emitting elements until the appliance operates according to the control instructions), or be otherwise associated with the appliance.

In one variation of association determination, the user device is placed or held next to the appliance (e.g., in front of, adjacent the appliance sensor, between the appliance and the lighting system, etc.). Individual EM signal emitting element sets of the lighting system are sequentially operated (e.g., scrolled through) to project light from different EM signal emitting elements (e.g., different elements arranged in different arcuate or radial positions; projecting light radially outward, etc.) automatically, in response to an arcuate manual input, or operated in any other suitable manner. The EM signal emitting element sets preferably have fixed, known angular, radial, or other position relative to the lighting system. The EM signal emitting element sets can be operated in a manner similar to the method disclosed in U.S. application Ser. No. 14/720,180 filed 22 May 2015, incorporated herein in its entirety by this reference, but alternatively operated in any other suitable manner. The user device notifies the system when an EM signal emitted by the EM signal emitting element is proximal or illuminates the appliance and/or the light sensor of the user device. The identifiers of the EM signal emitting element(s) in operation when the appliance and/or user device light sensor was illuminated are then associated with the appliance.

In one example of a variant, individual visible light emitting element sets of the lighting system are sequentially operated (e.g., scrolled through) to project light from different visible light emitting elements (e.g., different elements arranged in different arcuate or radial positions) automatically, in response to an arcuate manual input, or controlled in any other suitable manner. The light emitting element sets preferably have fixed, known angular, radial, or other position relative to the lighting system. The light emitting element sets can be operated in a manner similar to the method disclosed in U.S. application Ser. No. 14/720,180 filed 22 May 2015, incorporated herein in its entirety by this reference, but alternatively operated in any other suitable manner. The user device (or user) notifies the system when a visible light emitted by the visible light emitting element is proximal or illuminates the appliance and/or the light sensor of the user device. The identifiers of the visible light emitting element(s) in operation when the appliance and/or user device light sensor was illuminated are then identified, and the EM signal emitting element(s) associated with the visible light emitting element(s) that were in operation are then associated with the appliance. The EM signal emitting element associated with the appliance is preferably the EM signal emitting element proximal the identified visible light emitting element (e.g., arcuately or radially adjacent the identified visible light emitting element, within the same group as the identified visible light emitting element, etc.), wherein the position of the EM signal emitting element relative to the identified visible light emitting element on the lighting system is known, but can alternatively be an EM signal emitting element configured to direct light in substantially the same direction as the identified visible light emitting element, or be any other suitable EM signal emitting element.

In a specific example, associating the EM signal emitting element (e.g., invisible light emitting element, infrared light emitting element, etc.) with the appliance includes: scrolling through a set of visual light emitting elements having predetermined angular positions on the lighting system, including, at each of a set of timestamps, concurrently operating a visual light emitting element in a high mode and operating a remainder of the set in a low mode; storing each of the set of timestamps with an identifier for the visual light emitting element concurrently operated in the high mode; receiving an association notification from a user device, the association notification including an association timestamp and an identifier for the appliance; determining a reference timestamp from the set of timestamps substantially matching the association timestamp; determining the visual light emitting element identifier, stored in association with the reference timestamp, as a reference visual light emitting element identifier; determining an identifier for an invisible light emitting element located adjacent the visual light emitting element identified by the reference visual light emitting element identifier; and storing the invisible light emitting element identifier in association with the appliance identifier. However, the invisible light emitting element can be otherwise associated with the appliance.

In a second variation of association determination, the EM signal emitting element proximal the appliance (e.g., most proximal the appliance) can be determined after the lighting system associated with the appliance is automatically identified (e.g., using the methods described above). In this variation, the lighting system can determine its rotational orientation relative to the appliance, such that a lighting system reference point position relative to the appliance is known; retrieve a known position of the EM signal emitting elements relative to the reference point; and determine the EM signal emitting element(s) most proximal the appliance and/or the EM signal emitting element(s) configured to direct EM signals toward the appliance based on the lighting system rotational position and EM signal emitting element positions relative to the lighting system reference point.

In a first variation, determining the position of the lighting system reference point relative to an external reference point includes determining the orientation of the lighting system using an onboard compass or other positioning system. In a second variation, determining the position of the lighting system reference point relative to an external reference point includes selectively powering a single or subset of EM signal emitting elements (indexing light emitting elements) and detecting the light on a mobile device including a light sensor (e.g., a camera or other light sensor). The location of the mobile device can be recorded in response to a detected light parameter (e.g., intensity) surpassing a predetermined threshold. Because the emission direction of the EM signal emitting element is known and the location of the indexing EM signal emitting element relative to the remainder of EM signal emitting elements on the lighting system is known, the orientation of the indexing EM signal emitting element and remainder EM signal emitting elements can be determined once the recipient device geographic location is recorded.

However, the position of one or more EM signal emitting elements relative to the appliance can be otherwise determined and associated with the appliance.

Determining a modulation pattern to communicate the control instruction to the appliance S400 functions to process the appliance instruction into instructions for EM signal emitting element operation. The modulation pattern (e.g., PWM modulation pattern) can be determined by the receiving device (e.g., the device initially receiving the control instruction), by the sending device (e.g., the device sending the control instruction), the lighting system operating its EM signal emitting elements according to the modulation pattern, or by any other suitable device. The modulation pattern is preferably the pattern required to communicate an equivalent of the control instructions (or derivative thereof) using the EM signal emitting element(s), but can alternatively be any other suitable modulation pattern. Alternatively, the method can include generating operation instructions for a lighting system emitter (e.g., RF operation instructions, A/V instructions, etc.) to communicate the control instructions to the appliance. However, the control instruction (or derivatory instruction) can be otherwise communicated to the appliance via the lighting system.

Determining a modulation pattern can additionally include selecting the communication protocol, which functions to translate control instructions in a first communication protocol to control instructions in a second communication protocol. The communication protocol is preferably selected based on the communication protocol(s) accepted by the appliance (wherein the accepted communication protocols can be retrieved from a database or otherwise determined), but can alternatively be otherwise determined. Different EM signal emitting element types can be used when different communication protocols are selected, wherein the operated EM signal emitting element preferably corresponds to the selected communication protocol. Alternatively, different modulation patterns can be selected based on the selected communication protocol. However, the selected communication protocol can be otherwise used.

Controlling an EM signal emitting element of a lighting system according to the modulation pattern S220 functions to communicate the control instruction (or derivatory instruction) to the appliance. Alternatively, this can include controlling one or more emitters of the lighting system (e.g., RF emitters, microwave emitters, BLE transceivers, etc.) according to the operation instructions, which were determined based on the control instructions. However, the control instruction can be otherwise communicated to the appliance.

The EM signal emitting element controlled according to the modulation pattern can be: all EM signal emitting elements of the lighting system; the EM signal emitting element associated with the appliance (e.g., as determined above); or be any other suitable EM signal emitting element or set thereof. In one example, controlling the EM signal emitting element according to the modulation pattern includes: operating the identified infrared light emitting element according to the modulation pattern; and operating a second infrared light emitting element of the plurality according to a second modulation pattern different from the modulation pattern. The EM signal emitting element is preferably controlled by the processor of the lighting system according to the modulation pattern (e.g., by regulating power provision to the element), but can alternatively be controlled by the remote computing system (e.g., remote server system), a user device, or be controlled by any other suitable system.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

The invention claimed is:

1. A method for control signal extension, comprising:

receiving a control instruction for an appliance at a device remote from the appliance, the device associated with a user account;

identifying a lighting system proximal the appliance from a plurality of lighting systems associated with the user account, wherein the lighting system comprises a plurality of individually indexed infrared light emitting elements;

identifying an infrared light emitting element proximal the appliance from the plurality of individually indexed infrared light emitting elements;

determining a first modulation pattern to communicate the control instruction to the appliance; and controlling an infrared light emitting element of the lighting system according to the first modulation pattern by:

(1.) operating the identified infrared light emitting element according to the first modulation pattern; and (2.) operating a second infrared light emitting element of the plurality of individually indexed infrared light emitting elements according to a second modulation pattern different from the first modulation pattern; and determining a position of the identified infrared light emitting element relative to the appliance, comprising:

(1.) at each of a set of timestamps, concurrently operating one visual light emitting element in a high mode and operating a remainder of the set in a low mode;

(2.) storing each of a set of timestamps with an identifier for the visual light emitting element concurrently operated in the high mode;

(3.) receiving an association notification from a user device, the association notification including an association timestamp and an identifier for the appliance;

(4.) determining a reference timestamp from the set of timestamps substantially matching the association timestamp;

(5.) determining the visual light emitting element identifier, stored in association with the reference timestamp, as a reference visual light emitting element identifier;

(6.) determining an identifier for an infrared light emitting element located adjacent the visual light emitting element identified by the reference visual light emitting element identifier; and (7.) storing the infrared light emitting element identifier in association with the appliance identifier, wherein identifying the infrared light emitting element proximal the appliance comprises retrieving the infrared light emitting element identifier associated with the appliance identifier.

2. The method of claim 1, wherein:

the lighting system proximal the appliance is a first lighting system, the plurality of lighting systems comprises the first lighting system and a second lighting system, the first lighting system comprises:

(a.) a first set of light emitting elements configured to emit visible light or infrared light; and (b.) a first communication module comprising at least one processor operatively connected to the first set of light emitting elements, the first communication module configured to:

receive the control instruction;

determine the first modulation pattern based on the received control instruction; and control the first set of light emitting elements according to the first modulation pattern; and the second lighting system is positioned within a line of sight of the first lighting system, and the second lighting system comprises:

(a.) a light sensor configured to sense the first modulation pattern of the visible light or the infrared light emitted by the first set of light emitting elements of the first lighting system; and (b.) a second communication module comprising at least one processor operatively connected to the light sensor, the second communication module configured to:

receive data indicative of the first modulation pattern sensed by the light sensor; and determine a transformed control instruction based on the received data indicative of the first modulation pattern.

3. The method of claim 2, wherein each of the first set of light emitting elements is independently controllable.

4. The method of claim 2, wherein:

the first set of light emitting elements of the first lighting system are configured to emit visible light, the first lighting system comprises a second set of light emitting elements configured to emit visible light, and the first communication module is further configured to:

control the first set of light emitting elements at a first intensity; and control the second set of light emitting elements at a second intensity that is different from the first intensity, wherein the first set of light emitting elements and the second set of light emitting elements cooperatively emit visible light having a target light parameter value that is indicative of the first modulation pattern.

5. The method of claim 2, wherein the control instruction comprises a lighting instruction or an appliance instruction, and wherein the first communication module is further configured to determine whether the control instruction is the appliance instruction or the lighting instruction based on a length of the control instruction, a communication protocol of the control instruction, an endpoint address included within the control instruction, or commands within the control instruction.

6. The method of claim 2, wherein:

the first set of light emitting elements of the first lighting system are configured to emit visible light, the first lighting system comprises a second set of light emitting elements configured to emit infrared light, and the first communication module is further configured to:

control the first set of light emitting elements according to the first modulation pattern in an instance in which the control instruction comprises a lighting instruction; and control the second set of light emitting elements according to the first modulation pattern in an instance in which the control instruction comprises an appliance instruction.

7. The method of claim 2, wherein:

the control instruction comprises a lighting instruction or an appliance instruction, and the first communication module is further configured to:

determine whether the received control instruction is the appliance instruction or the lighting instruction;

in an instance in which the control instruction is the lighting instruction, determine a target color parameter value from the control instruction and control emission intensities of the first set of light emitting elements to match the target color parameter value; and in an instance in which the control instruction is the appliance instruction, determine the first modulation pattern based on the received control instruction.

8. The method of claim 2, wherein:

the first lighting system comprises a second set of light emitting elements, the first set of light emitting elements and the second set of light emitting elements are configured to emit visible light, the control instruction comprises a lighting instruction, and the first communication module is further configured to:

determine a target color parameter value from the control instruction; and independently control emission intensities of the first and the second set of light emitting elements to cooperatively emit visible light having a color parameter value substantially matching the target color parameter value, the first and second sets of light emitting elements configured to emit light having a first and second fixed color parameter value, respectively, wherein the first and second fixed color parameter values are different.

9. The method of claim 2, further comprising a peripheral device that is positioned within a line of sight of the second lighting system, wherein:

the second lighting system comprises a first set of light emitting elements configured to emit infrared light, the second communication module is configured to control the first set of light emitting elements of the second lighting system by pulsing or adjusting an intensity or saturation of the infrared light emitted by the first set of light emitting elements of the second lighting system, and the peripheral device is configured to receive the emitted infrared light from the first set of light emitting elements of the second lighting system.

10. The method of claim 1, further comprising:

determining whether the control instruction is an appliance instruction or a lighting instruction;

in response to the control instruction being the lighting instruction:

determining a target color parameter value from the control instruction;

and independently controlling emission intensities of a first and second set of light emitting elements of the lighting system to cooperatively emit visible light having a color parameter value substantially matching the target color parameter value, the first and second sets of light emitting elements configured to emit light having a first and second fixed color parameter value, respectively, wherein the first and second fixed color parameter values are different; and in response to the control instruction being the appliance instruction, determining the first modulation pattern.

11. The method of claim 1, wherein identifying the lighting system proximal the appliance comprises:

determining an appliance identifier based on the control instruction; and determining an identifier for the lighting system, stored in association with the appliance identifier;

wherein the method further comprises storing the lighting system identifier in association with the appliance identifier in response to receipt of a user input associating the identifier for the lighting system with the appliance identifier.

12. The method of claim 1, further comprising sending the control instruction to the lighting system, comprising:

addressing the control instruction to the lighting system; and broadcasting the addressed control instruction to all lighting systems associated with the user account;

wherein the lighting system determines the first modulation pattern.

13. The method of claim 1, wherein the device comprises a second lighting system outside of an infrared appliance communication range, wherein the second lighting system receives the control instruction from a user device.

14. The method of claim 1, further comprising:

sending the control instruction to a remote computing system; and sending data indicative of the control instruction to the lighting system from the remote computing system.

15. The method of claim 14, wherein the first modulation pattern is determined by the remote computing system, wherein the first modulation pattern is sent to the lighting system as the data indicative of the control instruction.

16. The method of claim 14, further comprising, at the remote computing system:

determining context parameter values associated with control instruction receipt;

assigning the context parameter values with the control instruction to form a control record; extracting a context parameter value pattern associated with the control instruction from a plurality of control records; and in response to an instantaneous set of context parameter values substantially matching the context parameter value pattern, controlling the lighting system according to the first modulation pattern.

17. The method of claim 16, wherein a first context parameter value pattern comprises power receipt at the lighting system and a second context parameter value pattern comprises cessation of power provision to the lighting system; wherein controlling the lighting system according to the first modulation pattern in response to the instantaneous set of context parameter values substantially matching the context parameter value pattern comprises:

in response to power receipt at the lighting system:

concurrently communicating a first set of control instructions associated with the first context parameter value pattern to a plurality of appliances through a plurality of lighting systems; and storing power in power storage devices on-board each of the plurality of lighting systems; and in response to cessation of power provision to the lighting system, concurrently communicating a second set of control instructions, different from the first set and associated with the second context parameter value pattern, to the plurality of appliances through the plurality of lighting systems, wherein each of the plurality of lighting systems communicates a respective subset of the second set of control instructions to a respective appliance using the power stored in the respective power storage device.

18. A connected lighting system comprising:

a first set of light emitting elements; and a first communication module comprising at least one processor operatively connected to the first set of light emitting elements, the first communication module configured to:

receive a control instruction for an appliance at a device remote from the appliance, the device associated with a user account;

identify a lighting system proximal the appliance from a plurality of lighting systems associated with the user account, wherein the lighting system comprises a plurality of individually indexed infrared light emitting elements;

identify an infrared light emitting element proximal the appliance from the plurality of individually indexed infrared light emitting elements; determining a first modulation pattern to communicate the control instruction to the appliance; and control an infrared light emitting element of the lighting system according to the first modulation pattern by:

(1.) operating the identified infrared light emitting element according to the first modulation pattern; and (2.) operating a second infrared light emitting element of the plurality of individually indexed infrared light emitting elements according to a second modulation pattern different from the first modulation pattern; and determine a position of the identified infrared light emitting element relative to the appliance, comprising:

(1.) at each of a set of timestamps, concurrently operate one visual light emitting element in a high mode and operate a remainder of the set in a low mode;

(2.) store each of a set of timestamps with an identifier for the visual light emitting element concurrently operated in the high mode;

(3.) receive an association notification from a user device, the association notification including an association timestamp and an identifier for the appliance;

(4.) determine a reference timestamp from the set of timestamps substantially matching the association timestamp;

(5.) determine the visual light emitting element identifier, stored in association with the reference timestamp, as a reference visual light emitting element identifier;

(6.) determine an identifier for an infrared light emitting element located adjacent the visual light emitting element identified by the reference visual light emitting element identifier; and (7.) store the infrared light emitting element identifier in association with the appliance identifier, wherein identify the infrared light emitting element proximal the appliance comprises retrieve the infrared light emitting element identifier associated with the appliance identifier.

* * * * *